(12) United States Patent
Diamond et al.

(10) Patent No.: US 7,078,164 B1
(45) Date of Patent: Jul. 18, 2006

(54) HIGH THROUGHPUT SCREEN FOR IDENTIFYING POLYMERIZATION CATALYSTS FROM POTENTIAL CATALYSTS

(75) Inventors: Gary M. Diamond, San Jose, CA (US); Christopher Goh, San Francisco, CA (US); Margarete K. Leclerc, Santa Clara, CA (US); Vince Murphy, Campbell, CA (US); Howard W. Turner, Campbell, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/596,851

(22) Filed: Jun. 19, 2000

(51) Int. Cl.
- *C12Q 1/00* (2006.01)
- *G01N 31/10* (2006.01)
- *C08F 10/00* (2006.01)

(52) U.S. Cl. .............. 435/4; 435/DIG. 9; 435/DIG. 10; 435/DIG. 11; 435/DIG. 12; 435/DIG. 13; 435/DIG. 29; 435/DIG. 30; 436/37; 436/147; 436/159; 436/161; 436/164; 422/62; 422/93; 422/196; 422/197

(58) Field of Classification Search .... 435/DIG. 9–13, 435/DIG. 29–33, 4; 436/37, 147, 159, 161, 436/164; 422/62, 93, 196, 197
See application file for complete search history.

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,153,282 A | 10/1992 | Datta et al. | 526/75 |
| 5,236,998 A * | 8/1993 | Lundeen et al. | 525/52 |
| 5,270,393 A | 12/1993 | Sagane et al. | 525/210 |
| 5,318,935 A | 6/1994 | Canich et al. | 502/117 |
| 5,324,801 A | 6/1994 | Brekner et al. | 526/160 |
| 5,453,410 A | 9/1995 | Kolthammer et al. | 502/155 |
| 5,495,036 A | 2/1996 | Wilson et al. | 556/12 |
| 5,504,049 A | 4/1996 | Crowther et al. | 502/117 |
| 5,599,761 A | 2/1997 | Turner | 502/152 |
| 5,616,664 A | 4/1997 | Timmers et al. | 526/127 |
| 5,883,204 A | 3/1999 | Spencer et al. | 526/134 |
| 5,907,021 A | 5/1999 | Turner et al. | 526/160 |
| 5,919,983 A | 7/1999 | Rosen et al. | 568/3 |
| 5,985,356 A | 11/1999 | Schultz et al. | 427/8 |
| 6,030,917 A | 2/2000 | Weinberg et al. | 502/104 |
| 6,034,775 A | 3/2000 | McFarland et al. | 356/364 |
| 6,174,975 B1 | 1/2001 | Johnson et al. | 526/172 |
| 6,756,195 B1 * | 6/2004 | Weinberg et al. | 435/4 |

FOREIGN PATENT DOCUMENTS

| | | |
|---|---|---|
| EP | 0 277 004 A1 | 8/1988 |
| EP | 0 805 142 A1 | 11/1997 |
| WO | WO 94/17113 | 8/1994 |
| WO | WO 96/13529 | 5/1996 |
| WO | WO 97/32208 | 9/1997 |
| WO | WO 97/42232 | 11/1997 |
| WO | WO 97/42239 | 11/1997 |
| WO | WO 98/03521 | 1/1998 |
| WO | WO 98/15813 | 4/1998 |
| WO | WO 99 05318 | 2/1999 |
| WO | WO 99/06413 | 2/1999 |
| WO | WO 99/51980 | 10/1999 |
| WO | WO 00/09255 | 2/2000 |
| WO | WO 00/36410 | 6/2000 |
| WO | WO 00/40331 | 7/2000 |

OTHER PUBLICATIONS

Chung, T.C., et al, *Metallocene Catalysts and Borane Reagents in The Block/Graft Reactions of Polyolefins*, Polym. Mater. Sci. Eng., v. 73, p. 463 (1995).

Gibson, et al., Angew. Chem. Int. Ed., 1999, vol. 38, pp. 428-447.

Scollard, et al., "Living Polymerization of α-Olefins by Chelating Diamide Complexes of Titanium," J. Am. Chem. Soc. 1996, 118:10008-10009.

Guérin, et al., "Conformationally Rigid Diamide Complexes: Synthesis and Structure of Tantalum(III) Alkyne Derivatives," Organometallics 1995, 14:3154-3156.

Piers, et al. "New Bifunctional Perfluoroaryl Boranes: Synthesis and Reactivity of the Ortho-Phenylene-Bridged Diboranes 1,2-$[B(C_6F_5)_2]_2C_6X_4$ (X=H, F)", J. Am. Chem. Soc., 1999, 121, 3244-3245.

* cited by examiner

*Primary Examiner*—Padmashri Ponnaluri
*Assistant Examiner*—My-Chau T. Tran

(57) ABSTRACT

A method is disclosed for screening potential catalysts for polymerization performance. The method includes the steps of reacting a potential catalyst with at least a first monomer under polymerization conditions, determining the polymerization performance of the catalyst with the at least first monomer, and using the determination as a predictor for the polymerization performance of the catalyst for at least a second monomer, wherein the first and second monomers are different from each other and the first monomer is an olefin other than ethylene. The method provides a useful, concrete and tangible result that has particular value for identifying appropriate catalysts for olefin polymerization and copolymerization.

44 Claims, 8 Drawing Sheets

HIGH THROUGHPUT SCREEN FOR IDENTIFYING POLYMERIZATION CATALYSTS FROM POTENTIAL CATALYSTS

BACKGROUND OF THE INVENTION

1. Field of the Invention

This invention relates to systems for discovering polymerization catalysts, and more particularly, to methods, materials, and devices for making and screening combinatorial libraries to identify polymerization catalysts. In particular, the invention relates to a screening method that identifies catalysts that can successfully polymerize—and preferably copolymerize—olefin monomers.

2. Discussion

The present invention relates to rapidly synthesizing and identifying catalysts that can polymerize and co-polymerize a variety of olefin monomers. Ethylene is perhaps the most widely polymerized olefin, and catalysts for producing the most common variations of polyethylene, such as "low density" (LDPE), "high density" (HDPE), and "linear low density" (LLDPE) polyethylene are generally well known. As is also well known, LDPE and LLDPE are copolymers of ethylene with another monomer, such as 1-butene, 1-hexane or 1-octene.

As known to those familiar with olefin polymers, however, catalyzing the polymerization of larger olefins is difficult, and catalyzing the co-polymerization of different olefins is even more difficult, particularly when seeking a resulting copolymer with a desired set of properties. Although the task of identifying and synthesizing appropriate copolymer catalysts has been approached with some logic, the large number of candidate compounds has forced a relatively slow pace upon the development of satisfactory catalysts.

The slow pace of discovery is due, in part, to the time and expense of synthesizing and testing catalysts using conventional techniques. In traditional material science, researchers synthesize a candidate catalyst that they test or screen to decide whether it warrants further study. Combinatorial chemistry is one approach for accelerating the discovery of new polymerization catalysts. In general, combinatorial chemistry refers to the concurrent synthesis and/or testing of relatively large numbers of compounds and stands in some contrast to more traditional methods in which smaller numbers of compounds are synthesized or tested in sequential, one-by-one fashion. See, for example, U.S. Pat. No. 6,030,917 which is incorporated entirely herein by reference. It is a powerful research strategy when used to discover materials whose properties depend on many factors. Researchers in the pharmaceutical industry have successfully used such techniques to dramatically increase the speed of drug discovery. Material scientists have employed combinatorial methods to develop novel high temperature superconductors, magnetoresistive materials, phosphors, and catalysts. See, Borman, *Combinatorial Chemistry Redefining the Scientific Method*, Chemical & Engineering News, Vol. 78, No. 20, 53–65; and Dogani, *Materials a la Combi*, id at 6–68.

Currently, some of the high throughput screens that are used to seek reactive catalysts from a group of potential catalysts analyze the supposed polymerization reaction while the reaction is occurring, such as by measuring a heat of reaction with in an infrared screen. See WO 97/32208, which is incorporated entirely herein by reference. However, such high throughput screens require reaction monitoring equipment (such as an IR camera) that may be expensive and not generally robust, yet sensitive enough for an industrial research program.

Also, some of these techniques monitor a secondary characteristic of a chemical reaction (e.g., heat of reaction as noted above) rather than the properties of the end product (e.g., the physical and chemical properties of a desired copolymer). Although such secondary information can be useful, in other situations, primary information about the product may be more valuable, and in some cases, quite necessary. For example, IR detection of heat of reaction of ethylene with a catalyst does not tell one whether, for example, butene or polyethylene is being prepared.

Other existing high throughput screens are useful for measuring properties of the resulting polymers made from the synthesis of a combinatorial library. See, for example, U.S. patent applications Ser. Nos. 09/285,363; 09/285,333; 09/285,335; or 09/285,392; each of which was filed on Apr. 2, 1999, and each of which is incorporated herein by reference (and a version of which published as WO 99/51980, which is also incorporated herein by reference).

In these methods, the potential polymerization catalyst is tested using one or more monomer(s) that the catalyst will hopefully polymerize. However, some monomers are difficult to handle in a combinatorial research program that uses automated equipment. As recognized by those familiar with combinatorial techniques, the availability of automated equipment that can handle large numbers of samples (usually small samples) in relatively rapid fashion provides the capability for carrying out combinatorial techniques. Stated differently, compounds that cannot be handled using automated equipment are harder to evaluate using combinatorial techniques.

For example, the polyolefin market in the U.S. alone has been estimated at about 60 billion pounds in recent years. Although some of this market is made up of larger olefin polymers (e.g., about 6 billion pounds per year of polystyrene), the majority is made up of smaller monomer polymerization; e.g., the various types of polyethylene referred to above, as well as polypropylene. Although catalysts that will polymerize olefins may have similar properties, those catalyzing properties can and do differ among the various olefins. Thus, as a first evaluation, catalysts should be identified that will homopolymerize any given monomer efficiently. Because copolymers are so important, however, catalysts also need to be identified that will copolymerize different monomers, and do so in desired manners and proportions. For example, a catalyst that copolymerizes two olefins in a manner such that the proportion of one overwhelms the other is not helpful if a more balanced proportion of each monomer is desired or necessary.

In this regard, ethylene reacts with many potential polymerization catalysts. Thus, testing ethylene may provide little or no information about catalysts that will successfully polymerize or copolymerize other monomers, particularly the larger monomers. In addition, monitoring secondary information for ethylene will not provide information regarding whether butenes or oligomers are being made or of a polymer of a desired molecular weight is being prepared.

Thus, a new method of screening catalysts for polymerization activity is needed, where such monomers can be easily handled in a combinatorial research methodology, and a screen of the product properties is need. The needed method should also be fast, given the vast number of possible catalysts.

OBJECT AND SUMMARY OF THE INVENTION

Thus, it is an object of this invention to provide a system (e.g., method and apparatus) for high throughput screening of potential polymerization catalysts that uses a monomer that is easily handled as a predictor of polymerizations with monomers that are not as easily handled, but using the same catalyst. In this regard, it is further an object of this invention to provide a high throughput screening system for potential polymerization catalysts that uses a monomer that is liquid at room temperature and pressure as a predictor of the polymerization of gaseous monomers or combinations of gaseous and liquid monomers, or combinations of liquid monomers. Additionally, it is an object of this invention to provide a high throughput screening system for potential polymerization catalysts that uses a monomer that is gaseous as a predictor of the polymerization of other gaseous monomers or combinations of gaseous and liquid monomers.

It is another object of this invention to screen potential olefin polymerization catalysts in parallel or in array format for catalyst activity using one or more monomers to predict catalyst activity with different monomers.

It is yet a further object of this invention to predict catalyst performance for the homopolymerization of a first monomer using the homopolymerization of a second monomer. It is an object of this invention to predict catalyst performance for the copolymerization of a first and second monomer using the homopolymerization of either the second or a third monomer. It is still a further object of this invention to predict catalyst performance for the co-polymerization of a first and second monomer using the co-polymerization of either second and third monomers or third and fourth monomers.

It is still another object of this invention to provide a system for screening potential polymerization catalysts that provides information on the properties of the polymers prepared in the polymerization reaction so that polymerization conditions and/or catalysts can be assessed.

The invention meets these objects with a method for screening potential catalysts for polymerization performance. The method comprises reacting a potential catalyst with at least a first monomer under polymerization conditions, determining the polymerization performance of the catalyst with the at least first monomer, and using the determination as a predictor for the polymerization performance of the catalyst for at least a second monomer, wherein the first and second monomers are different from each other and the first monomer is an olefin other than ethylene.

In another aspect, the invention is a method of screening potential catalysis for polymerization activity wherein the polymerization activity of the potential catalysts is determined for at least a first monomer as a predictor for the polymerization activity of the potential catalysts for at least a second monomer, the first and second monomers being different from each other and the first monomer being an olefin other than ethylene. In this aspect the method comprises reacting each of an array of at least 8 potential polymerization catalysts that are different from each other with at least a first monomer under polymerization conditions, and determining the polymerization performance of each of the potential catalysts with the at least first monomer.

In yet another aspect, the invention is a method for high throughput screening of potential catalysts for polymerization activity that comprises providing an array of potential polymerization catalysts, wherein the array comprises at least 8 potential catalysts that are chemically different from each other, reacting each of the potential catalysts with at least a first monomer under polymerization conditions, measuring the polymerization activity of each of the potential catalysts with the at least first monomer, and predicting the polymerization activity of each of the potential catalysts for at least a second monomer, wherein the first and second monomers are chemically different from each other and the first monomer is an olefin other than ethylene. The throughput is, typically, to react an array of potential catalysts with at least a first monomer for between about 15 minutes and 2 hours, and then screen the results in rapid fashion (e.g., using rapid size exclusion chromatography, which may work at rates of 8 minutes per sample or less). As a result, a large number of catalysts can be prepared and evaluated at a much higher throughput than can be provided by conventional techniques.

In another aspect, the invention is a screening method for high throughput screening of potential catalysts for polymerization activity for at least a second monomer that comprises concurrently reacting a plurality of at least 8 potential catalysts arrayed on a substrate with a first monomer, wherein the first and second monomers are chemically different from each other, and determining a property of any polymer sample or polymerization mixture made during the reaction step at a rate of ten minutes or less per potential catalyst. The throughput can reach or exceed 96 experiments per hour. Other throughput rates are discussed below.

In yet another aspect, the invention is a method comprising the steps of providing an array of potential catalysts, reacting at least some of the members of the array with a monomer that is an α-olefin to form a homopolymer of the α-olefin and testing the homopolymer for at least one property, such as viscosity, molecular weight or concentration. The testing of the homopolymer is typically accomplished using rapid size exclusion chromatography, but can also be done with other methods.

The foregoing and other objects, advantages, and features of the invention, and the manner in which the same are accomplished, will become more readily apparent upon consideration of the invention taken in conjunction with the accompanying drawings, which illustrate preferred and exemplary embodiments, and wherein:

DETAILED DESCRIPTION

Figure 1:
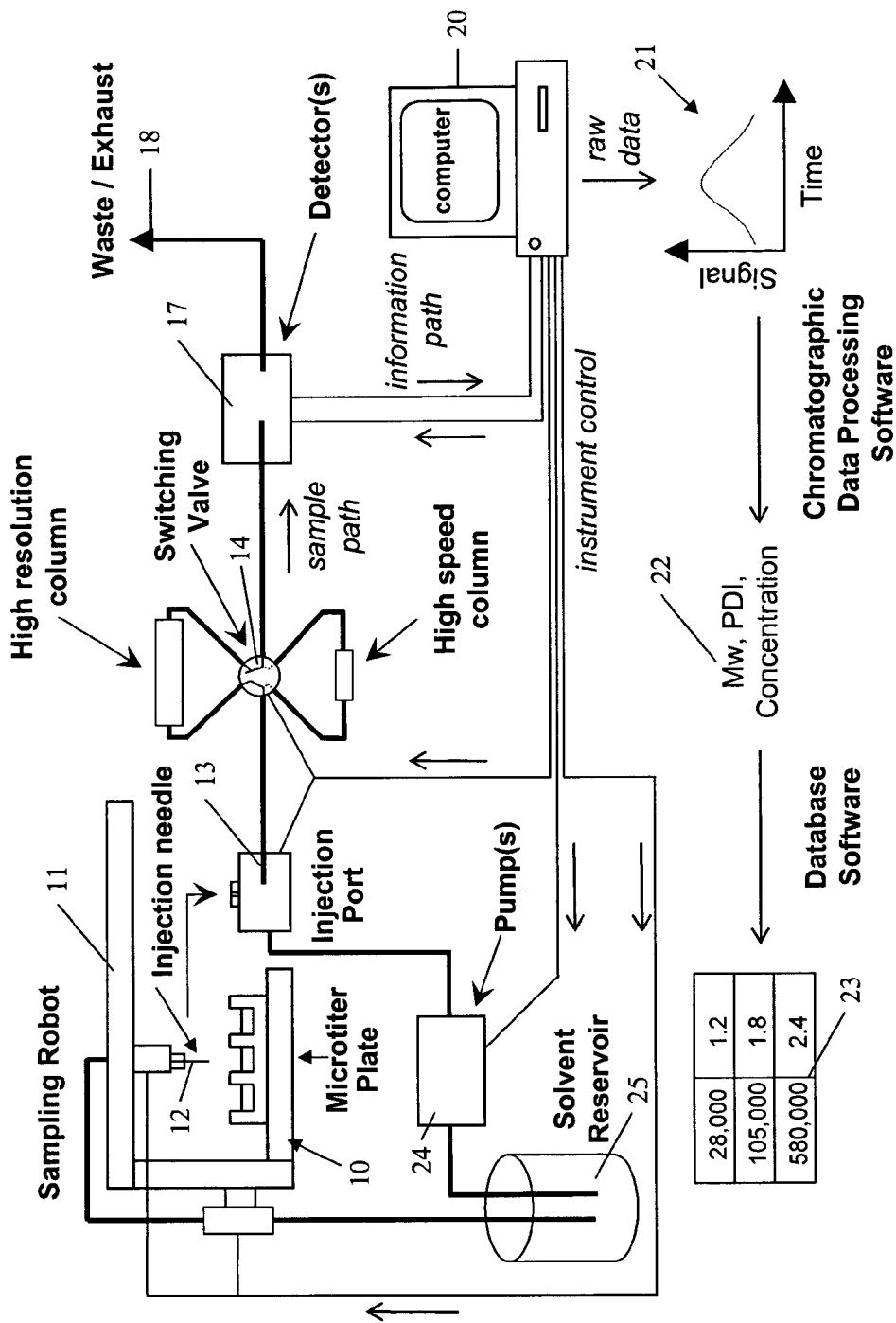
FIG. 1 is a schematic diagram of the preferred hardware used to carry out the determining part of the method of the invention.

In a broad aspect, the present invention is the use of a simple parallel primary screen (in array format) based on the homopolymerization of an α-olefin (e.g., 1-octene) that is typically liquid at room temperature and pressure, as a predictor for catalyst performance in polymerizations. The invention can be applied to a wide range of polymerizations, copolymerizations and higher order polymerizations. The discussion herein is an exemplary one focusing upon polymerizations and copolymerizations involving gaseous monomers or combinations of gaseous and liquid monomers or combinations of liquid monomers, especially ethylene/α-olefin copolymerization (e.g., ethylene/1-octene and ethylene/styrene copolymerizations) and propylene homopolymerization. The invention also applies to terpolymerizations (e.g., ethylenepropylene-diene monomer, "EPDM").

In another aspect, the invention uses high throughput liquid chromatography techniques, such as the Symyx® Rapid GPC (Symyx Technologies, Inc., 3100 Central Expressway, Santa Clara, Calif. 95051) to screen, post-reaction, in parallel and/or rapid serial fashion for polymer molecular weight (Mw) and polymer concentration (and thus catalyst activity) in the primary screen.

In yet another aspect, the invention incorporates the use of a modified reaction block, capable of operating at high (above ambient) pressure, at high or low temperature, to perform homopolymerizations (e.g., propylene) and copolymerizations (e.g., ethylene/1-octene, ethylene/styrene or ethylene/polar comonomer copolymerizations) using gaseous monomers or combinations of gaseous and liquid monomers in a parallel fashion in an array format In yet another aspect, the invention uses a specific liquid α-olefin in a primary screen to predict catalyst performance with other monomers, singly or in combination, for homopolymerizations and/or copolymerizations. For example, catalyst performance for 1-octene homopolymerization can be used to predict catalyst performance for propylene homopolymerizations, and for ethylene/octene and ethylene/styrene copolymerizations. 1-octene homopolymerizations can also be used to predict other polymerizations, as those of skill in this art will appreciate from the review of this specification. Furthermore, the degree of α-olefin incorporation into a copolymer containing the α-olefin can be predicted from the performance or molecular weight from the α-olefin homopolymerization primary screen.

The present invention offers particular advantages over previous olefin polymerization and copolymerization primary screening techniques, which, even though useful, have focused on the use of Infrared Thermography (IRT) to detect the heat of reaction, using heat emitted as the figure of merit for the screen.

In contrast, the present invention uses Symyx®'s proprietary Rapid GPC system (gel permeation chromatography, performed on the samples of the array in a rapid serial fashion) to determine the amount of polymer formed, the molecular weight distribution and the molecular weight of the polymer product from each of the polymerization reactions of the array. The polymer molecular weight and polymer concentration (reflecting catalyst activity), and optionally the shape of the distribution curve, e.g., unimodal vs. bimodal, are used as figures of merit in the screen.

One advantage of this invention over the use of IRT is that this invention provides information on the properties of the polymer product generated in the screen, especially the molecular weight of the polymer. This allows one to screen catalyst candidates and polymerization conditions on the basis of molecular weight, not just activity (heat in the case of IRT, or polymer concentration in the case of this invention).

A further advantage of this invention over previously disclosed olefin polymerization primary screening technology is the use of a monomer that is liquid at room temperature and pressure (e.g., 1-octene) rather than a gaseous monomer (e.g., ethylene or propylene). A liquid monomer allows for simplified screening methodology and hardware because the polymerization screening can be performed in an array of open vessels (e.g., glass vials) at ambient temperature and pressure, rather than in a pressure chamber.

Although the invention is particularly useful with liquid monomers, the method can also comprise using an array substrate that has been modified to allow the use of gaseous reagents at high (above ambient) pressure. The modified substrate allows for follow-up and comparison screens using gaseous monomers (e.g., propylene homopolymerization or ethylene/vinyl chloride copolymerization) or combinations of gaseous and liquid monomers, or combinations of liquid monomers (e.g., ethylene/1 octene, ethylene/styrene, or ethylene/polar comonomer copolymerizations). For use of monomers that are liquid at room temperature and pressure, the temperature of the polymerization may be higher, e.g. at the boiling point of the monomer.

A further advantage of this invention is that it is a post-reaction screen, in contrast to the use of IRT as a primary screen, which is a real-time technique. The primary advantages of post-reaction screen over a real-time screen are: (i) real-time reaction monitoring equipment (e.g., an IR camera plus associated hardware) is not required; and (ii) multiple screening experiments are easier to perform simultaneously with the invention.

A further advantage of this technique is that the poly(1-octene) products, or other polymers prepared, are soluble in organic solvents at room temperature, facilitating the use of liquid chromatography and particularly Rapid GPC screening.

In a first embodiment, the method of the invention comprises reacting a potential catalyst with at least a first monomer under polymerization conditions. Thereafter, the polymerization performance of the catalyst is determined with the at least first monomer, following which the determination is used as a predictor for the polymerization performance of the catalyst for at least the second monomer, where in the first and second monomers are different from each other and the first monomer is an olefin other than ethylene.

It will be understood that the terms "first," "second," or "third," when used to refer to monomers, are used to distinguish between different monomers. In particular, the terms are used to differentiate between the monomer used to screen the catalysts (usually the "first" monomer) and the different monomer ("second" or "third") whose polymerization (or copolymerization) characteristics can be successfully predicted based on the performance of the first monomer in the screen of the present invention. In addition, those of skill in the art will appreciate that the term "catalyst" is used throughout this specification to refer to a compound that speeds a chemical reaction or causes it to occur. Catalysts that may be used in the present invention are generally described below, but certain of the compounds will require "activation" prior to being catalytically active while other compounds will be "activator-free catalysts" and will not require activation prior to being catalytically active. Activators and activating techniques are also discussed generally below. Also as used herein, the term alpha (α)

olefin refers to olefins in which the first carbon atom includes the double bond. As used herein, the term "α-olefin" excludes ethylene. As used herein, the terms "activity" and "performance" are used somewhat interchangeably to refer to qualitative characteristics of the catalysts and the polymers (or polymerization reactions). "Performance" is considered to be a more general term, while those of skill in this art will recognize that the term "activity" can also be used in a specific sense with respect to catalysts (for example, as a measure of mass of polymer formed per unit time), but in each case the meaning will be clear in context.

In preferred embodiments, the first monomer is 1-octene, and the second (or third) monomer is selected from the group consisting of the lower olefins (ethylene, propene, 1-butene, 1-pentene, 1-hexene, and 1-heptene), as well as compounds that polymerize in a similar fashion.

In particular, those skilled in the art of olefin polymerization are generally familiar with the reaction rates of olefins (i.e., those olefins most commonly used for commercial polymers) relative to each other. See, Krentsel, POLYMERS AND COPOLYMERS OF HIGHER α-OLEFINS: CHEMISTRY, TECHNOLOGY, APPLICATIONS, Hanser/Gardner, Cincinnati, Ohio (1997). Accordingly, the definitive information that the invention provides about the first polymer is quite useful in this art for the planning and execution of additional screens, laboratory or commercial polymerization or copolymerization, or other necessary or desired tasks. Stated differently, the screening method of the invention—standing alone and even in the absence of further steps—provides a useful, concrete and tangible result that has practical utility to those of skill in this art.

Preferably, the step of using the determination as a predictor comprises copolymerizing the first and second monomers using the catalysts, and most preferably copolymerizing the first and second monomers in commercial quantities using the catalyst.

In other embodiments, the step of determining the polymerization performance also comprises quenching the polymerization reaction and thereafter measuring a characteristic of the reaction products. In another embodiment, the step of using the determination as predictor comprises polymerizing the second monomer using the catalyst.

In another aspect, the step of using the determination comprises measuring the molecular weight of the polymer formed under the polymerization conditions and using the catalyst. In the same manner, the step of using the determination can also comprise measuring the concentration of the polymer formed under the polymerization conditions and using the catalyst, as well as (or alternatively) measuring the polydispersity index (PDI) of the polymer formed under the polymerization conditions and using the catalyst.

In preferred embodiments, the step of determining the polymerization performance comprises analyzing the polymer, including the parameters just mentioned, using a high throughput chromatography technique, more preferably a high through put size exclusion chromatography technique, and most preferably the Symyx® GPC technique referred to earlier herein.

In preferred embodiments, and as one of the advantages of the invention, the method comprises screening catalysts using a first monomer that is a liquid at room temperature and atmospheric pressure, with octene being preferred.

In another embodiment, of the screening method, the determination is used as a predictor for the polymerization performance of the catalyst for a copolymerization of two or more monomers, one of which includes at least the first monomer.

In another aspect, the invention comprises a method of screening potential catalysts for polymerization activity wherein the polymerization activity of the potential catalysts is determined for at least a first monomer as a predictor for the polymerization activity of the potential catalysts for at least a second monomer, the first and second monomers being different from one another and the first monomer being an olefin other than ethylene. In this aspect, the method comprises reacting each of an array of at least eight potential polymerization catalysts that are different from each other with at least the first monomer under polymerization conditions and thereafter determining the polymerization performance of each of the potential catalysts with at least the first monomer.

Depending upon the desired information, the step of determining the polymerization performance of the catalysts can comprise measuring the molecular weight of the polymer produced using each catalyst in the array. The polymerization performance (e.g., catalyst activity) may also be determined by weighing the reaction vial before and after the polymerization reaction. Polymer properties, such as glass transition temperature and DSC melting point, can be measured also using a sensor array modular measurement system, as disclosed in co-pending commonly owned U.S. patent applications Ser. No. 09/458,398, filed Dec. 10, 1999; Ser. No. 09/210,485, filed Dec. 11, 1998; Ser. No. 09/210,428, filed Dec. 11, 1998; and Ser. No. 09/210,086, filed Dec. 11, 1998; which are all incorporated herein by reference. Polymer viscosity can be measured using a high throughput viscometer, such as that disclosed in co-pending commonly owned U.S. patent application Ser. No. 09/578,997, filed May 25, 2000, which is incorporated herein by reference. Physical properties of the polymers may be measured using a parallel dynamic mechanical analyzer, such as that disclosed in co-pending commonly owned U.S. patent application Ser. No. 09/580,024, filed May 26, 2000, which is incorporated herein by reference.

In another aspect, the method can further comprise the step of co-polymerizing the first and second monomers using one of the catalysts in the array based upon the polymerization performance of the catalyst, and more preferably comprises co-polymerizing the first and second monomers in commercial quantities. In other preferred embodiments, the step of determining the polymerization performance comprises quenching the polymerization reaction and thereafter measuring a characteristic of the reaction products. The method can further comprise the step of polymerizing the second monomer using the catalyst, and more preferably polymerizing the second monomer in commercial quantities.

The step of determining the polymerization performance can also comprise measuring the concentration of the polymer formed in the presence of the catalyst, or measuring the polydispersity index of the polymer formed under the polymerization conditions and using the catalyst. As recognized by those of skill in this art, the polydispersity index is representative of the ratio of the weight-average degree of polymerization (or molecular weight) to the number-average degree of polymerization (or molecular weight) and thus provides useful information about the characteristics of the polymer; see, e.g., Odian, *Principles of Polymerization,* 2d Ed. At page 91 (1981).

In preferred embodiments, the step of determining the polymerization performance comprises analyzing the polymer using a high throughput chromatography technique, and most preferably a size exclusion technique such as gel permeation chromatography.

As set forth in the experimental section herein, the screening method preferably uses an array. Preferably the array is a physical substrate that has wells therein with each of the at least eight catalyst residing in the different wells of the substrate. Additionally, the wells may contain vials (made of glass, plastic or other appropriate material) that hold the reactants. This makes it easier to clean and/or reuse the substrate. Thus, the substrate may have at least as many wells as the array so that each well can be used for a different catalyst. In some embodiments, and as described later herein, the number of wells will be a multiple of the number of catalysts being tested, so that additional factors (such as the effect of particular activators or concentrations) can be concurrently evaluated. Using such a physical arrangement, the screening method of the invention can further comprise the step of adding other compositions to the wells other than the first or second monomers or the catalysts. Such compositions can include activators, scavengers or modifiers, the nature and use of which are well understood by those of ordinary skill in this art, and that will not be otherwise described in detail herein other than to explain the present invention.

Presently, a preferred array is formed of 96 vials. Although the geometry is rarely critical, such arrays are typically formed of 8 rows of 12 columns each. Using 96 vials as an example, the method permits a number of factors to be evaluated at the same time; e.g., 8 catalysts, with 4 different activators and 3 catalyst concentrations can be concurrently run in such a 96-vial array. It will be immediately understood, however, that any desired number and combination of factors could be selected, such as 8 catalysts, 12 activators, and 1 concentration. Because the invention is most useful as a screen—i.e., respectively, qualifying and eliminating respective groups of catalysts—a minimum of two or three parameters (such as catalyst composition, activator composition, ratios of components, scavengers, additives, modifiers, olefins and/or concentration) are usually considered in each array. Other embodiments use different numbers of array members, such as at least 8, at least 24 or at least 48 members in an array. Members of the arrays may be standards or blanks for known scientific purposes.

In more preferred embodiments, the screening method of the invention comprises dispensing the first monomer as a liquid into each reaction vessel that contains one of the potential catalysts prior to the step of reacting the catalyst with the first activator. This may help to stabilize the catalyst compound prior to activation. Alternatively, and by using other equipment described in the experimental section herein, the method of the invention can comprise distributing the first monomer as a gas to each reaction vessel that contains one of the potential catalysts prior to the step of reacting the catalyst with the activator.

Accordingly, depending upon the additives, the screening method of the present invention can further comprise activating the potential catalysts and wherein the at least first monomer is provided to each reaction vessel prior to activation of the potential catalysts.

One of the benefits of the present invention is its flexibility in providing a large number of choices as to the specific results taken from the screening method. Thus, the step of determining the polymerization performance of the catalysts typically comprises measuring a property of any polymer sample made during the reaction step. Appropriate properties include (but are not limited to) molecular weight, polydispersity index, viscosity, concentration, solubility, melt flow index, glass transition temperature, melting point, crystallinity (usually measured as a percentage), density, polymer mass, polymer composition, polymer structure, polymer architecture, or combinations of these properties. The measurement and interpretation of these properties are generally well-understood in the polymer arts, and will not be discussed in detail herein other than as necessary to describe the present invention.

The method of the invention can also comprise measuring properties of the polymerization reaction mixture, rather than the properties of the polymer itself. Such properties can include (but are not limited to): monomer concentration, monomer conversion, ratio of catalyst to polymer, catalyst residue, light scattering techniques, viscosity, temperature, visual inspection, including the forced precipitation of insolubles, intrinsic viscosity, polymer concentration, molecular weight, product mass and combinations thereof. Such measurements and their interpretations are likewise well understood in this art.

In some embodiments, the reactions are limited to a predetermined amount of time. In these embodiments, the reacting step is preferably carried out to a predetermined point and then stopped, which is referred to as "quenching," herein. Appropriate measurements for such a predetermined point can include (but are not limited to): time of reaction, monomer consumption, heat of reaction, polymer concentration, viscosity, and molecular weight. Thus, the screening method may further comprise the step of quenching the reaction at the predetermined point.

In another embodiment, the screening method of the invention comprises concurrently reacting all of the potential catalysts in the array with the first monomer. Once again, the determination of the screen can be used as a predictor for the polymerization activity of the potential catalysts for the copolymerization of the second monomer with yet a third monomer. In this embodiment, the invention can further comprise the step of co-polymerizing the second and third monomers, and more preferably doing so in commercial quantities.

Because the invention can be described in terms of olefin polymers, and although the reaction is not limited to such polymers, the method of invention comprises screening a first monomer that is an alpha olefin that may be represented by either of the following formulas:

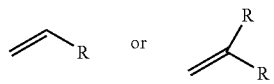

or alternatively,

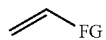

wherein each R is independently selected from the group consisting of halogen, alkyl, substituted alkyl, aryl, substituted aryl, heteroalkyl, cycloalkyl, substituted cycloalkyl, heterocycloalkyl, substituted heterocycloalkyl, heteroaryl, substituted heteroaryl, alkoxy, sityl, boryl, phosphino, amino, thio, seleno and combinations thereof, and FG a functional group that contains at least one heteroatom (a heteroatom selected from the group consisting of N, O, P, B, S, Si, Sb, Al, Sn, As, Se and Ge) or halogen (e.g., Cl, F, Br, etc.). Functional monomers within the formula comprising FG include $C_1$–$C_{20}$ acrylates, $C_1$–$C_{20}$ methacrylates, $C_1$–$C_{20}$ vinylacetates, acrylic acid, methacrylic acid, maleic anhydride, vinyl acetate, vinyl ethers, acrylonitrile, acrylamide, vinyl chloride and mixtures thereof.

The disubstituted olefins useful in accordance with the invention include essentially any having the generic formula $CH_2=R^2(R^3)(R^4)$, $R^2$ is C, and $R^3$ and $R^4$ are, independently, essentially hydrocarbyl groups containing at least one carbon atom bound to $R^2$. Preferably $R^3$ and $R^4$ are linear, branched or cyclic, substituted or unsubstituted, hydrocarbyl groups having from 1 to 100 carbon atoms, preferably 30 or less carbon atoms, and optionally $R^3$ and $R^4$ are connected to form a cyclic structure. Thus the term disubstituted olefins includes both monomers, such as isobutylene, and macromers having the representative structure above. Though $R^3$ and $R^4$ are to be essentially hydrocarbyl, the inclusion of non-hydrocarbyl atoms (such as O, S, N, P, Si, halogen etc.) is contemplated where such are sufficiently far removed from the double-bond so as not to interfere with the coordination polymerization reactions with the catalyst and so as to retain the essentially hydrocarbyl characteristic of being largely soluble in hydrocarbon solvents. The substituted olefins specifically include isobutylene, 3 trimethylsilyl-2-methyl 1-propene, 2-methyl-1-butene, 2-methyl-1-pentene, 2-ethyl-1-pentene, 2 methyl-1 hexene, 2-methyl-1-heptene, cc 6-dimethylamino-2-methyl-1-hexene, methylstyrene and the like as representative compounds.

The coordination polymerizable monomers which may be copolymerized in accordance with the invention include one or more of: C3 and higher α olefins, styrene and hydrocarbyl-substituted styrene monomers wherein the substituent is on the aromatic ring, C6 and higher substituted a-olefins, C4 and higher internal olefins, C4 and higher diolefins, and C5 and higher cyclic olefins and diolefins. Preferred a olefins include a olefins having 3 to 30 carbon atoms, preferably 3 to 20 carbon atoms, but 1-olefin macromers having more than 30 carbon atoms, up to about 100 carbons atoms and more can similarly be used.

Preferred α-olefins thus include propylene, 1-butene, 1-pentene, 1 hexene, 1-heptene, 1-octene, 1-nonene, 1-decene, 1-dodecene, 4-methyl-1-pentene, 5 methyl-1 nonene, 3-methyl-1-pentene, 3,5,5-trimethyl-1-hexene, and vinylcyclohexane. Styrene and paramethylstyrene are preferred styrenic olefins. Preferred diolefins include those described in the literature for ethylene copolymers, specifically for EP and EPDM rubber. Examples include straight chain acyclic diolefins, branched acyclic diolefins, single ring alicyclic diolefins, multi-ring alicyclic fused and bridged ring diolefins and cycloalkenyl-substituted alkenes. Preferred examples are 1,4-hexadiene, dicyclopentadiene, 5-ethylidene-2-norbornene, vinylcyclohexene and 5 vinyl-2 norbornene.

The C6 and higher substituted α-olefins include those containing at least one Group 13 to 17 atom bound to a carbon atom of the substituted α-olefin. Examples include allyltrimethylsilane, 4,4,4-trifluoro-1-butene, methyl alkyl ether, methyl allyl thiother, and dimethyl allyl amine. The use of functional group containing α-olefins is also within the scope of the invention when such olefins can be incorporated in the same manner as are their (x-olefin analogs. See, "Metallocene Catalysts and Borane Reagents in The Block/Graft Reactions of Polyolefins", T. C. Chung, et al, Polym. Mater. Sci. Eng., v. 73, p. 463 (1995), and the masked α-olefin monomers of U.S. Pat. No. 5,153,282. Such monomers permit the preparation of both functional-group containing invention copolymers capable of subsequent derivatization and of functional macromers which can be used as graft and block type polymeric segments.

Cyclic olefins capable of copolymerization in accordance with the invention include cyclopentene, norbornene, alkyl-substituted norbornenes, cyclohexene, cycloheptene and those further described in the background documents and patent literature, see WO 94/17113 and U.S. Pat. Nos. 5,270,393 and 5,324,801.

Definitions:

As used herein, the phrase "characterized by the formula" is not intended to be limiting and is used in the same way that "comprising" is commonly used. The term "independently selected" is used herein to indicate that the R groups, e.g., $R^1$, $R^2$ and $R^3$ can be identical or different (e.g., $R^1$, $R^2$ and $R^3$ may all be substituted alkyls or $R^1$ and $R^2$ may be a substituted alkyl and $R^3$ may be an aryl, etc.). A named R group will generally have the structure that is recognized in the art as corresponding to R groups having that name. For the purposes of illustration, representative R groups as enumerated above are defined herein. These definitions are intended to supplement and illustrate, not preclude, the definitions known to those of skill in the art.

The term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), hexyl, vinyl, n-butyl, tert-butyl, i-butyl (or 2-methylpropyl), etc. In particular embodiments, alkyls have between 1 and 200 carbon atoms, between 1 and 50 carbon atoms or between 1 and 20 carbon atoms. To some, "alkyl" as used here may be considered to be a non-cyclic, non-aromatic hydrocarbyl.

"Substituted alkyl" refers to an alkyl as just described in which one or more hydrogen atom to any carbon of the alkyl is replaced by another group such as a halogen, aryl, substituted aryl, cycloalkyl, substituted cycloalkyl, and combinations thereof. Suitable substituted alkyls include, for example, benzyl, trifluoromethyl and the like.

The term "heteroalkyl" refers to an alkyl as described above in which one or more carbon atoms of the alkyl is replaced by a heteroatom selected from the group consisting of N, O, P, B, S, Si, Se and Ge. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, 2-furyl, $Me^3SiOCH_2(CH_3)_2C^-$ and the like.

The term "cycloalkyl" is used herein to refer to a saturated or unsaturated cyclic non-aromatic hydrocarbon radical having a single ring or multiple condensed rings. Suitable cycloalkyl radicals include, for example, cyclopentyl, cyclohexyl, cyclooctenyl, bicyclooctyl, etc. In particular embodiments, cycloalkyls have between 3 and 200 carbon atoms, between 3 and 50 carbon atoms or between 3 and 20 carbon atoms.

"Substituted cycloalkyl" refers to cycloalkyl as just described including in which one or more hydrogen atom to any carbon of the cycloalkyl is replaced by another group such as a halogen, alkyl, substituted alkyl, aryl, substituted aryl, cycloalkyl, substituted cycloalkyl, heterocycloalkyl, substituted heterocycloalkyl, heteroaryl, substituted heteroaryl, alkoxy, aryloxy, boryl, phosphino, amino, silyl, thio, seleno and combinations thereof. Suitable substituted cycloalkyl radicals include, for example, 4-dimethylaminocyclohexyl, 4,5-dibromocyclohept-4-enyl, and the like.

The term "heterocycloalkyl" is used herein to refer to a cycloalkyl radical as described, but in which one or more or all carbon atoms of the saturated or unsaturated cyclic radical are replaced by a heteroatom such as nitrogen, phosphorous, oxygen, sulfur, silicon, germanium, selenium, or boron. Suitable heterocycloalkyls include, for example, piperazinyl, morpholinyl, tetrahydropyranyl, tetrahydrofuranyl, piperidinyl, pyrrolidinyl, oxazolinyl, and the like.

"Substituted heterocycloalkyl" refers to heterocycloalkyl as just described including in which one or more hydrogen atom to any atom of the heterocycloalkyl is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholine, and the like.

The term "aryl" is used herein to refer to an aromatic substituent which may be a single aromatic ring or multiple aromatic rings which are fused together, linked covalently, or linked to a common group such as a methylene or ethylene moiety. The common linking group may also be a carbonyl as in benzophenone or oxygen as in diphenylether or nitrogen in diphenylamine. The aromatic ring(s) may include phenyl, naphthyl, biphenyl, diphenylether, diphenylamine and benzophenone among others. In particular embodiments, aryls have between 1 and 200 carbon atoms, between 1 and 50 carbon atoms or between 1 and 20 carbon atoms.

"Substituted aryl" refers to aryl as just described in which one or more hydrogen atom to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphino, alkoxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. Specific example of substituted aryls include perfluorophenyl, chlorophenyl, 3,5-dimethylphenyl, 2,6-diisopropylphenyl and the like.

The term "heteroaryl" as used herein refers to aromatic rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more nonaromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

"Substituted heteroaryl" refers to heteroaryl as just described including in which one or more hydrogen atoms to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" is used herein to refer to the -OZ$^1$ radical, where Z$^1$ is selected from the group consisting of alkyl, substituted alkyl, cycloalkyl, substituted cycloalkyl, heterocylcoalkyl, substituted heterocycloalkyl, silyl groups and combinations thereof as described herein. Suitable alkoxy radicals include, for example, methoxy, ethoxy, benzyloxy, t-butoxy, etc. A related term is "aryloxy" where Z$^1$ is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

As used herein the term "silyl" refers to the -SiZ$^1$Z$^2$Z$^3$ radical, where each of Z$^1$, Z$^2$, and Z$^3$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein the term "boryl" refers to the -BZ$^1$Z$^2$ group, where each of Z$^1$ and Z$^2$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein, the term "phosphino" refers to the group -PZ$^1$Z$^2$, where each of Z$^1$ and Z$^2$ is independently selected from the group consisting of hydrogen, substituted or unsubstituted alkyl, cycloalkyl, heterocycloalkyl, heterocyclic, aryl, heteroaryl, silyl, alkoxy, aryloxy, amino and combinations thereof.

The term "amino" is used herein to refer to the group -NZ$^1$Z$^2$, where each of Z$^1$ and Z$^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "thio" is used herein to refer to the group -SZ$^1$, where Z$^1$ is selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

=The term "seleno" is used herein to refer to the group -SeZ$^1$, where Z$^1$ is selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

The term "saturated" refers to lack of double and triple bonds between atoms of a radical group such as ethyl, cyclohexyl, pyrrolidinyl, and the like. The term "unsaturated" refers to the presence one or more double and triple bonds between atoms of a radical group such as vinyl, acetylenyl, oxazolinyl, cyclohexenyl, acetyl and the like.

Ligands

In order to form the catalyst compounds or compositions used with this invention, typically, one or more ancillary ligands is added to a metal precursor with optionally at least one activator or activating technique. The ligands broadly are those ligands that bind metal ions (e.g., via covalent bonds, dative bonds or combinations thereof). Ligand characteristics that can be varied include, but are not limited to, the number of coordination sites on the metal which the ligand can occupy, the charge and electronic influence of the ligand, the geometry imposed on the metal by the ligand, the geometry imposed on the ligand by the metal, etc. A plethora of metal-binding ligands are known in the art. See, for example, Collman, J. P., et al. principles and applications of organotransition metal chemistry, University Science Books, California, 1987, and references therein which are herein incorporated by reference. The metal-ligand compounds or complexes may have more than one geometry.

Generally, the coordination sites of the ligand are 1, 2, 3 or 4, and the charge on the ligands are 0, −1, −2, or −3. By "charge on the ligand," in one embodiment, it is intended that this number refer to the number of non-dative covalent bonds that could be formed with the erbium metal center. In another embodiment, "charge on the ligand" refers to the charge that one skilled in the art would assign to the ligand to balance the overall charge of the metal-ligand complex when the metal center is considered to be an ion with a positive charge that is equivalent to the oxidation state of the metal, and may be represented by $M^{m+}$ with M being the metal and m being the oxidation state (which, e.g., for erbium is M=Er and m is typically 3). Other ligands include those wherein the charge is greater than the number of sites it occupies. Due to the nature of their structure, certain ligands will have more than one possible coordination number and/or more than one possible charge. Also, a ligand may be deprotonated prior to use with the erbium metal precursor or may be deprotonated upon reaction with the erbium metal precursor.

Examples of ligands that can be used in the present invention include, but are not limited to, the following:

(1) One-site, monoanionic ligands such as those that might form a complex like $Cp^*MR^+A^-$ (wherein R is as defined above, M is defined below and $A^-$=anion as defined below), and other mono-Cp systems or such as aryloxy that might form a complex like $(aryloxy)MR^+A^-$;

(2) Two-site, dianionic ligands, which include, for example, mono-Cp systems where a heteroatom based ancillary ligand occupies the second site (referred to in U.S. Pat. No. 5,064,802, the teachings of which are incorporated herein by reference); non-Cp amide systems (referred to in U.S. Pat. Nos. 5,318,935, 5,495,036 and J. Am. Chem. Soc. 1996, 118:10008–10009, the teachings of which are incorporated herein by reference);

(3) Two site, monoanionic ligands including, for example, those that might form a complex like $(CpL)MR^+A^-$ (where the L is a ligand, but is covalently linked to the cyclopentadienyl group, which may also include other substituents) and related systems (referred to in WO 96/13529, the teachings of which are incorporated herein by reference) or mono-Cp systems where a heteroatom based occupies the second site (such as European Patent Application 0 805 142 A1, WO 97/42232 and WO 97/42239, each of which are incorporated herein by reference).

(4) Two site, neutral ligands;

(5) Three site, neutral ligands;

(6) Three site, monoanionic ligands;

(7) Three site, dianionic ligands (an example of which is referred to in Organometallics 1995, 14:3154–3156, which is incorporated herein by reference);

(8) Four site, neutral, monoanionic and dianionic ligands; and

Ligands where the charge is greater than the number of sites it occupies (see, for example, U.S. Pat. No. 5,504,049, the teachings of which are incorporated herein by reference). More examples of the types of ligands described above may be found by those of skill in the art in Gibson, et al., Angew. Chem. Int. Ed., 1999, vol. 38, pp. 428–447, which is incorporated herein by reference.

In preferred embodiments, the coordination numbers (CN) of the ligand are independently 1, 2, 3 or 4, and the charge on the ligands are independently 0, −1 or −2. Preferred coordination numbers and charges are: (i) CN=2, charge=−2; (ii) CN=2, charge=−1; (iii) CN=1, charge=−1; (iv) CN=2, charge=0; (v) CN=3, charge=−1; (vi) CN=3, charge=−2; (vii) CN=3, charge=0; (viii) CN=4, charge=0; (ix) CN=4, charge=−1; (x) CN 4, charge=−2 and (xi) CN=1, charge=0. In other embodiments, the ligand has a charge, which is greater than the number of coordination sites it occupies on a metal ion, such as a CN=1 and charge=−2 ligand, for example imido ligands that are referred to in Gibson et al., Id. Thus, the format used to describe the classes of ligands herein is where the first number refers to the coordination number and the second number refers to the ligand charge, which appears as (coordination number, charge). Therefore, a (2, −2) ligand is a CN=2 and charge=−2 ligand.

Using the (coordination number, charge) notation, the ligands useful in this invention may be characterized by the formula:

$$\{(a,0)i(b,c)j\}$$

where a is the coordination number and is an integer from 1–4, b is the coordination number and is an integer from 1–4, c is the ligand charge and is −1 or −2, i is an integer from 0–5 and j is 0, 1 or 2, provided that the sum of i+j is greater than or equal to 1. Also, when c is −1, j is 1 or 2 and when c is −2, j is 1. The first part of this formula (a,0) is directed toward neutral ligands (charge=0) and may be provided by an atom with a lone pair of electrons (such as O, N, P, S or C with appropriate other substituents (e.g., carbenes when the atom is C) or by a bond (such as an in an agostic interaction or a pi (π) bond). The second part of this formula (b,c) is directed toward charged ligands and may be provided by one or more atoms (such as C, S, O, N, P, B, Si, Se, As, Te, with appropriate other substituents) or by a bond (such a pi (π) bond).

Selected examples of ligands that may be used in this invention, and showing the appropriate notation (coordination number, charge) are shown below. These ligands are shown in their protonated form, but may be de-protonated as described above.

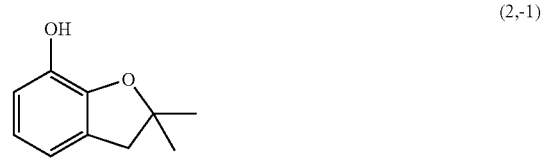

(2,-1)

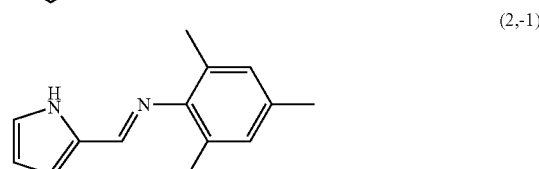

(2,-1)

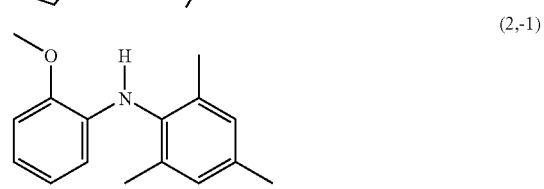

(2,-1)

-continued

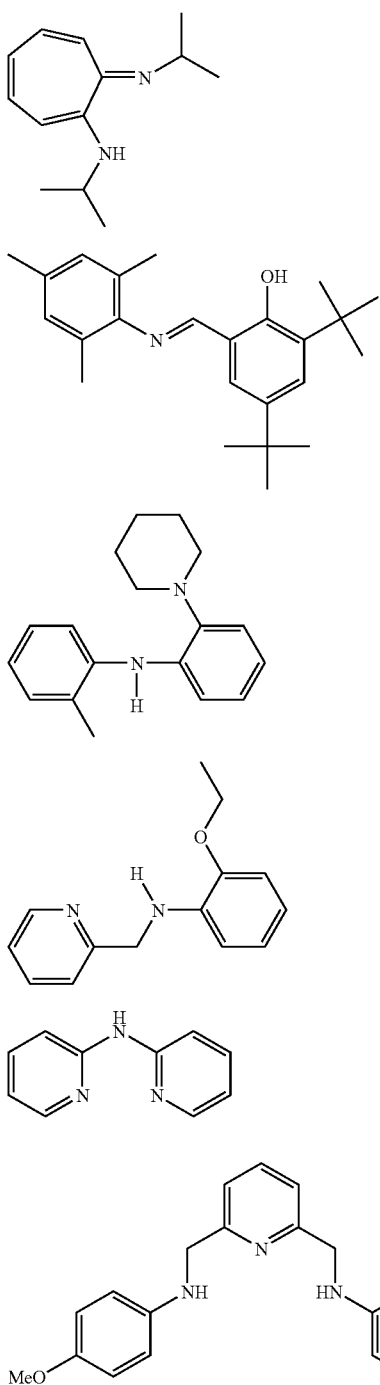

(2,-1)

(2,-1)

(2,-1)

(3,-1)

(3,-1)

(3,-2)

In other applications, the ligand will be mixed with a suitable metal precursor compound prior to or simultaneous with allowing the mixture to be contacted to the reactants. When the ligand is mixed with the metal precursor compound, a metal-ligand complex may be formed, which may be a catalyst. In connection with the metal complex and depending on the ligand or ligands chosen, the metal complex may take the form of dimers, trimers or higher orders thereof or there may be two or more metal atoms that are bridged by one or more ligands. Furthermore, two or more ligands may coordinate with a single metal atom. The exact nature of the metal complex(es) or compound(s) formed depends on the exact chemistry of the ligand and the method of combining the metal precursor and ligand, such that a distribution of metal complexes may form with the number of ligands bound to the metal being greater or less than the number of equivalents of ligands added relative to an equivalent of metal precursor.

Metal Precursors

Metal precursors may take the form of a metal atom, ion, compound or other metal precursor compound. In some embodiments, ligands may be combined with a metal precursor and the product of such combination is not determined, if a product forms at all. For example, ligands may be added to a reaction vessel at the same time as the metal or metal precursor compound along with additional reactants in the reaction of interest. As such, the result of the combination is not determined. The metal precursors may be characterized by the general formula M(L)n where M is a metal selected from the group consisting of Groups 3, 4, 5, 6, 7, 8, 9, 10, 11, 12, 13 and 14 of the Periodic Table of Elements. Specific metals include Sc, Y, La, Ti, Zr, Hf, C, Nb, Ta, Cr, Mo, W, Mn, Re, Fe, Ru, Os, Co, Rh, Ir, Ni, Pd, Pt, Cu, Ag, Au, Zn, Cd, Al, In, Tl and Sri. L is a ligand chosen from the group consisting of halide, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, hydroxy, boryl, silyl, hydrido, thio, seleno, phosphino, amino, and combinations thereof. When L is charged, L is selected from the group consisting of hydrogen, halogens, alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, acetoxy, silyl, boryl, phosphino, amino, thio, seleno, and combinations thereof. When L is neutral, L is selected from the group consisting of carbon monoxide, isocyanide, dibenzylideneacetone, nitrous oxide, $PA_3$, $NA_3$, $OA_2$, $SA_2$, $SeA_2$, and combinations thereof, wherein each A is independently selected from a group consisting of alkyl, substituted alkyl, heteroalkyl, cycloalkyl, substituted cycloalkyl, heterocycloalkyl, substituted heterocycloalkyl, aryl, substituted aryl, heteroaryl, substituted heteroaryl, alkoxy, aryloxy, silyl, and amino. The ligand to metal precursor ratio is determined by the research program of interest, and for example may be in the range of about 0.01:1 to about 100:1, or more specifically in the range of about 0.5:1 to about 20:1.

Polymerization Activators/Additives

The metal ligand complexes and compositions are active catalysts typically in combination with a suitable activator or activating technique, although some of the complexes (e.g., group 3 metal complexes) may be active without an activator or activating technique. Broadly, the activator may comprise alumoxanes, Lewis acids, Bronsted acids, compatible non-interfering activators and combinations of the foregoing. These types of activators have been taught for use with compositions or metal complexes in the following references, which are hereby incorporated by reference in their entirety: U.S. Pat. Nos. 5,599,761, 5,616,664, 5,453, 410, 5,153,157, 5,064,802, and EP-A-277,004. In particular, ionic or ion forming activators are preferred.

Suitable ion forming compounds useful as an activator in one embodiment of the present invention comprise a cation that is a Bronsted acid capable of donating a proton, and a compatible, non-interfering, anion, $A^-$. Preferred anions are those containing a single coordination complex comprising a charge-bearing metal or metalloid core. Mechanistically, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions that comprise coordination complexes containing a single metal or metalloid atom are, of course, well known and many, particularly such compounds containing a single boron atom in the anion portion, are available commercially.

Preferably such activators may be represented by the following general formula:

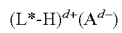

wherein, L* is a neutral Lewis base; (L*-H)+ is a Bronsted acid; $A^{d-}$ is a non-interfering, compatible anion having a charge of d−, and d is an integer from 1 to 3. More preferably $A^{d-}$ corresponds to the formula: $[M'^{3+}Q_h]^{d-}$ wherein h is an integer from 4 to 6; h−3=d; M' is an element selected from Group 13 of the Periodic Table of the Elements; and Q is independently selected from the group consisting of hydride, dialkylamido, halide, alkoxide, aryloxide, hydrocarbyl, and substituted-hydrocarbyl radicals (including halosubstituted hydrocarbyl, such as perhalogenated hydrocarbyl radicals), said Q having up to 20 carbons. In a more preferred embodiment, d is one, i.e., the counter ion has a single negative charge and corresponds to the formula $A^-$.

Activators comprising boron or aluminum which are particularly useful in the preparation of catalysts of this invention may be represented by the following general formula:

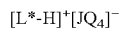

wherein: L* is as previously defined; J is boron or aluminum; and Q is a fluorinated C1-20 hydrocarbyl group. Most preferably, Q is independently selected from the group selected from the group consisting of fluorinated aryl group, especially, a pentafluorophenyl group (i.e., a $C_6F_5$ group) or a 3,5-bis$(CF_3)_2C_6H_3$ group. Illustrative, but not limiting, examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethylanilinium tetra-(3,5-bis(trifluoromethyl)phenyl)borate, N,N-dimethyl-(2,4,6-trimethylanilinium) tetraphenylborate, trimethylammonium tetrakis (pentafluorophenyl) borate, triethylammonium tetrakis (pentafluorophenyl) borate, tripropylammonium tetrakis (pentafluorophenyl) borate, tri(n-butyl)ammonium tetrakis (pentafluorophenyl) borate, tri(secbutyl)ammonium tetrakis (pentafluorophenyl) borate, N,N-dimethylanilinium tetrakis (pentafluorophenyl) borate, N,N-diethylanilinium tetrakis (pentafluorophenyl) borate, N,N-dimethyl-(2,4,6-trimethylanilinium) tetrakis(pentafluorophenyl) borate, trimethylammonium tetrakis-(2,3,4,6-tetrafluorophenylborate and N,N-dimethylanilinium tetrakis-(2,3,4,6-tetrafluorophenyl) borate; dialkyl ammonium salts such as: di-(i-propyl)ammonium tetrakis(pentafluorophenyl) borate, and dicyclohexylammonium tetrakis(pentafluorophenyl) borate; and tri-substituted phosphonium salts such as: triphenylphospnonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate; and N,N-dimethylanilinium tetrakis(3,5-bis(trifluoromethyl)phenyl)borate. Preferred [L*-H]+ cations are N,N-dimethylanilinium and tributylammonium. Preferred anions are tetrakis(3,5-bis(trifluoromethyl)phenyl)borate and tetrakis(pentafluorophenyl)borate. In some embodiments, the most preferred activator is $PhNMe_2H^+B(C_6F_5)_4^-$.

Other suitable ion forming activators comprise a salt of a cationic oxidizing agent and a non-interfering, compatible anion represented by the formula:

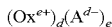

wherein: $Ox^{e+}$ is a cationic oxidizing agent having a charge of e+; e is an integer from 1 to 3; and Ad−, and d are as previously defined. Examples of cationic oxidizing agents include: ferrocenium, hydrocarbyl-substituted ferrocenium, $Ag^+$, or $Pb^{+2}$. Preferred embodiments of Ad− are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silyl cation and a non-interfering, compatible anion represented by the formula:

wherein: ⓒ+ is a $C_{1-100}$ carbenium ion or silyl cation; and $A^-$ is as previously defined. A preferred carbenium ion is the trityl cation, i.e. triphenylcarbenium. The silyl cation may be characterized by the formula $Z^1Z^2Z^3Si^+$ cation, where each of $Z^1$, $Z^2$, and $Z^3$ is independently selected from the group consisting of alkyl, substituted alkyl, cycloalkyl, heterocycloalkyl, heterocyclic, aryl, substituted aryl, heteroaryl, substituted heteroaryl and combinations thereof. In some embodiments, a most preferred activator is $Ph_3C^+B(C_6F_5)_4^-$.

In addition, suitable activators include Lewis acids, such as those selected from the group consisting of tris(aryl)boranes, tris(substituted aryl)boranes, tris(aryl)alanes, tris (substituted aryl)alanes, including activators such as tris (pentafluorophenyl)borane. Other useful ion forming Lewis acids include those having two or more Lewis acidic sites, such as those described in WO 99/06413 or Piers, et al. "New Bifunctional Perfluoroaryl Boranes: Synthesis and Reactivity of the ortho-Phenylene-Bridged Diboranes 1,2-$[B(C_6F_5)_2]_2C_6X_4(X=H, F)$", J. Am. Chem. Soc., 1999, 121, 3244–3245, both of which are incorporated herein by reference. Other useful Lewis acids will be evident to those of skill in the art. In general, the group of Lewis acid activators are within the group of ion forming activators (although exceptions to this general rule can be found) and the group tends to exclude the group 13 reagents listed below. Combinations of ion forming activators may be used.

Other general activators or compounds useful in a polymerization reaction may be used. These compounds may be activators in some contexts, but may also serve other functions in the polymerization system, such as alkylating a metal center or scavenging impurities. These compounds are within the general definition of "activator," but are not considered herein to be ion forming activators. These compounds include a group 13 reagent that may be characterized by the formula $G^{13}R'_{3-p}D_p$ where $G^{13}$ is selected from the group consisting of Al, B, Ga, In and combinations thereof, p is 0, 1 or 2, each R' is independently selected from the group consisting of alkyl, substituted alkyl, cycloalkyl, heterocycloalkyl, heterocyclic and combinations thereof, and each D is independently selected from the group consisting of halide, hydride, alkoxy, aryloxy, amino, thio, phosphino and combinations thereof. In other embodiments, the group 13 activator is an oligomeric or polymeric alumoxane compound, such as methylalumoxane and the known modifications thereof. In other embodiments, a divalent metal reagent may be used that is defined by the general formula $M'R'_{2-p}D_{p'}$ and p' is 0 or 1 in this embodiment and R' and D are as defined above. M' is the metal and is selected from the group consisting of Mg, Ca, Sr, Ba, Zn, Cd and combinations thereof. In still other embodiments, an alkali metal reagent may be used that is defined by the general formula M"R' and in this embodiment R' is as defined above. M" is the alkali metal and is selected from the group consisting of Li, Na, K, Rb, Cs and combinations thereof. Additionally, hydrogen and/or silanes may be used in the catalytic composition or added to the polymerization system. Silanes may be characterized by the formula $SiR'_{4-q}D_q$ where R' is defined as above, q is 1, 2, 3 or 4 and D is as defined above, with the proviso that there is at least one D that is a hydride.

The molar ratio of metal:activator (whether a composition or complex is employed as a catalyst) employed preferably ranges from 1:10,000 to 100:1, more preferably from 1:5000 to 10:1, most preferably from 1:10 to 1:1. In a preferred embodiment of the invention mixtures of the above compounds are used, particularly a combination of a group 13 reagent and an ion-forming activator. The molar ratio of group 13 reagent to ion-forming activator is preferably from 1:10,000 to 1000:1, more preferably from 1:5000 to 100:1, most preferably from 1:100 to 100:1. In a preferred embodiment, the ion forming activators are combined with a tri-alkyl aluminum, specifically trimethylaluminum, triethylaluminum, or triisobutylaluminum or with a dialkyl aluminum hydride such as di-isobutyl aluminum hydride. A most preferred combination is 2 equivalents of tris(perfluorophenyl)boron and 5 equivalents of tri(isobutyl)aluminum.

In other applications, the ligand will be mixed with a suitable metal precursor compound prior to or simultaneous with allowing the mixture to be contacted to the reactants. When the ligand is mixed with the metal precursor compound, a metal ligand complex may be formed, which may be a catalyst. In connection with the metal ligand complex and depending on the ligand or ligands chosen, the metal ligand complex may take the form of dimers, trimers or higher orders thereof or there may be two or more metal atoms that are bridged by one or more ligands. Furthermore, two or more ligands may coordinate with a single metal atom. The exact nature of the metal ligand complex(es) or compound(s) formed depends on the chemistry of the ligand and the method of combining the metal precursor and ligand, such that a distribution of metal ligand complexes may form with the number of ligands bound to the metal being greater or less than the number of equivalents of ligands added relative to an equivalent of metal precursor.

The ligands may be supported, with or without the metal coordinated, on an organic or inorganic support. Suitable supports include silicas, aluminas, clays, zeolites, magnesium chloride, polyethyleneglycols, polystyrenes, polyesters, polyamides, peptides and the like. Polymeric supports may be cross-linked or not. Similarly, the metal may be supported with or without the ligand, on similar supports known to those of skill in the art.

Experimental Techniques

In the most preferred embodiment, the present invention is a method of screening catalysts that will produce copolymers of 1-octene with other olefins. In principle, the invention incorporates the use of octene homopolymerization as a primary screen to find strong catalyst candidates for copolymerizing ethylene with other alpha-olefins as well as to find catalyst candidates capable of producing a wide range of copolymers.

The invention is based on the working hypothesis that a catalyst system capable of producing poly (1-octene) with significant molecular weight and high activity is also likely to be capable of producing ethylene/octene and other ethylene/alpha-olefin copolymers with desired comonomer incorporation.

In particular embodiments, the invention comprises the use of 1-octene ($C_8H_{16}$) homopolymerization as a primary screen, ethylene/octene copolymerization as a secondary screen. The principle of primary screening is based upon octene homopolymerization in a hydrocarbon solvent in a simple, liquid phase. In preferred embodiments, the screening is carried out in an array of 96 stirred 1 ml glass vials. In this basic embodiment, and as one of the advantages of the invention, it can be carried out at ambient temperature and pressure (although the invention can also be carried out at both high and low temperatures). In other preferred embodiments, the polymerization reaction can be carried out at higher temperatures, but below the boiling point of the chosen monomer used in the screening.

As set forth in those references, in a preferred embodiment, the invention incorporates the use of a liquid handling robot and/or multi-head pipettes to dispense the reagents. Following polymerization in the array, the invention uses size exclusion chromatography, and often gel permeation chromatography ("GPC") for simultaneous screening for both molecular weight and conversion (for example, to calculate catalyst activity). The preferred embodiment uses the Symyx® Rapid GPC which is likewise described in WO99/51980. It will thus be understood that throughout this specification, the phrase GPC is often used, but is used as an exemplary form of all types of size exclusion chromatography.

In another embodiment, the invention comprises carrying out the polymerization under high pressures and or high temperatures which allows for the ethylene/octene polymerization in similar formats. For high pressure screening, the invention likewise incorporates 96 wells in an 8-by-12 array but using a mini-reactor which allows gaseous monomers or other reagents to be used in the invention.

In a preferred embodiment, the 96-member array is formed from 8 rows and 12 columns of stirred 1 ml glass vials in an aluminum block. The stirring can be carried out quite efficiently by magnetic bars and (if desired) in conjunction with a hot plate.

FIG. 1 illustrates an overall schematic view of the hardware for carrying out the determining step of the method of the invention in preferred embodiments. FIG. 1 illustrates the microtiter plate broadly designated at 10 and the sampling robot broadly designated at 11. In the embodiment illustrated in FIG. 1, the injection needle 12 samples the microtiter plate 10. The injection needle 12, which is part of the sampling robot 11, removes the samples from the microtiter plate 10 and carries them to an injection port 13. The injection port 13 is the introductory portion of the preferred gel permeation chromatography system. From the injection port 13, the sample travels to the switching valve 14. The nature and operation of the switching valve 14, and the variety of techniques that it permits are also set forth in previously incorporated International Application No. WO99/51980.

FIG. 1 also sets forth that following its passage through the detector 17, the sample can be appropriately forwarded to a waste or exhaust system 18 for disposal or storage. Most of the polymers and co-polymers, and the monomer precursors from which they are formed, are well understood in this art, and appropriate handling of waste or exhaust in accordance with good safety and regulatory requirements is well known to those of ordinary skill in this art and will not be otherwise described in detail herein.

The detector 17 is in communication with a computer 20, which carries out a number of functions in accordance with both the method and apparatus of the invention. As FIG. 1 illustrates, raw data from the detector can be converted by the computer into an appropriate signal response, illustrated at 21 in FIG. 1. As FIG. 1 further shows, an appropriate set of data processing software can take the signal/time data and using the computer 20, convert it into appropriate information such as molecular weight, polymer dispersity index (PDI) and concentration, as indicated in the schematic box labeled 22. The database software can then produce the results in a desired formal as set forth in the representative small data table 23. FIG. 1 also illustrates that the computer 20 can be used to control the pumps 24 that in turn control the flow of solvent from a reservoir 25 for the chromatography process as well as the sampling and reaction process.

Figure 2:
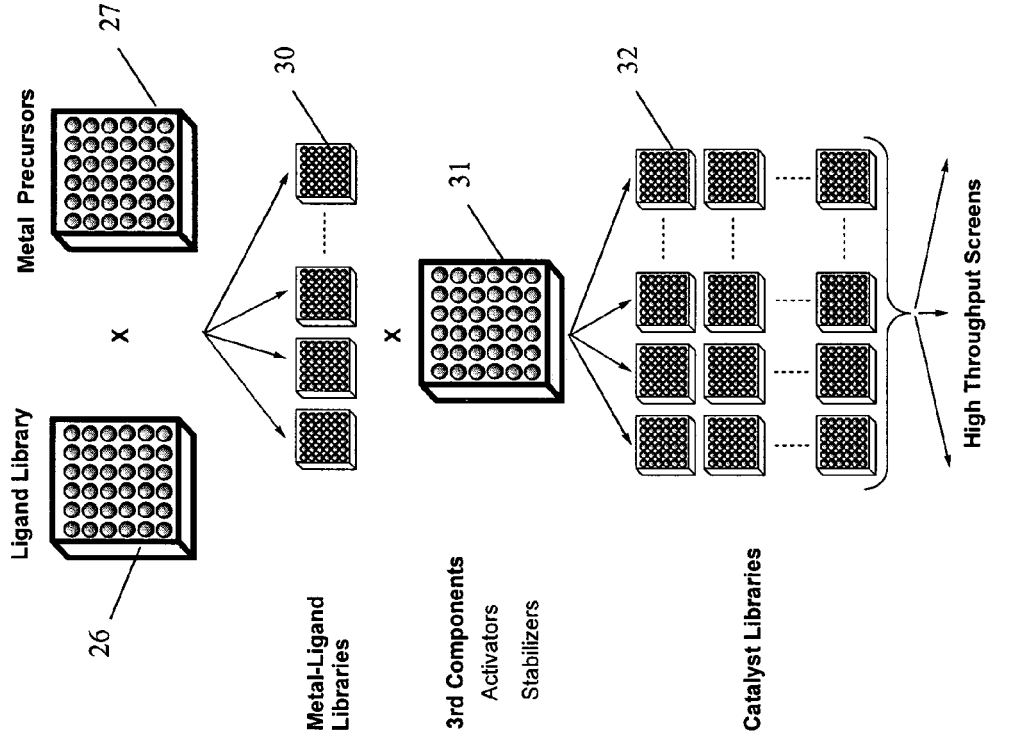
FIG. 2 is a schematic diagram of certain aspects of the method of the invention.
Figure 3:
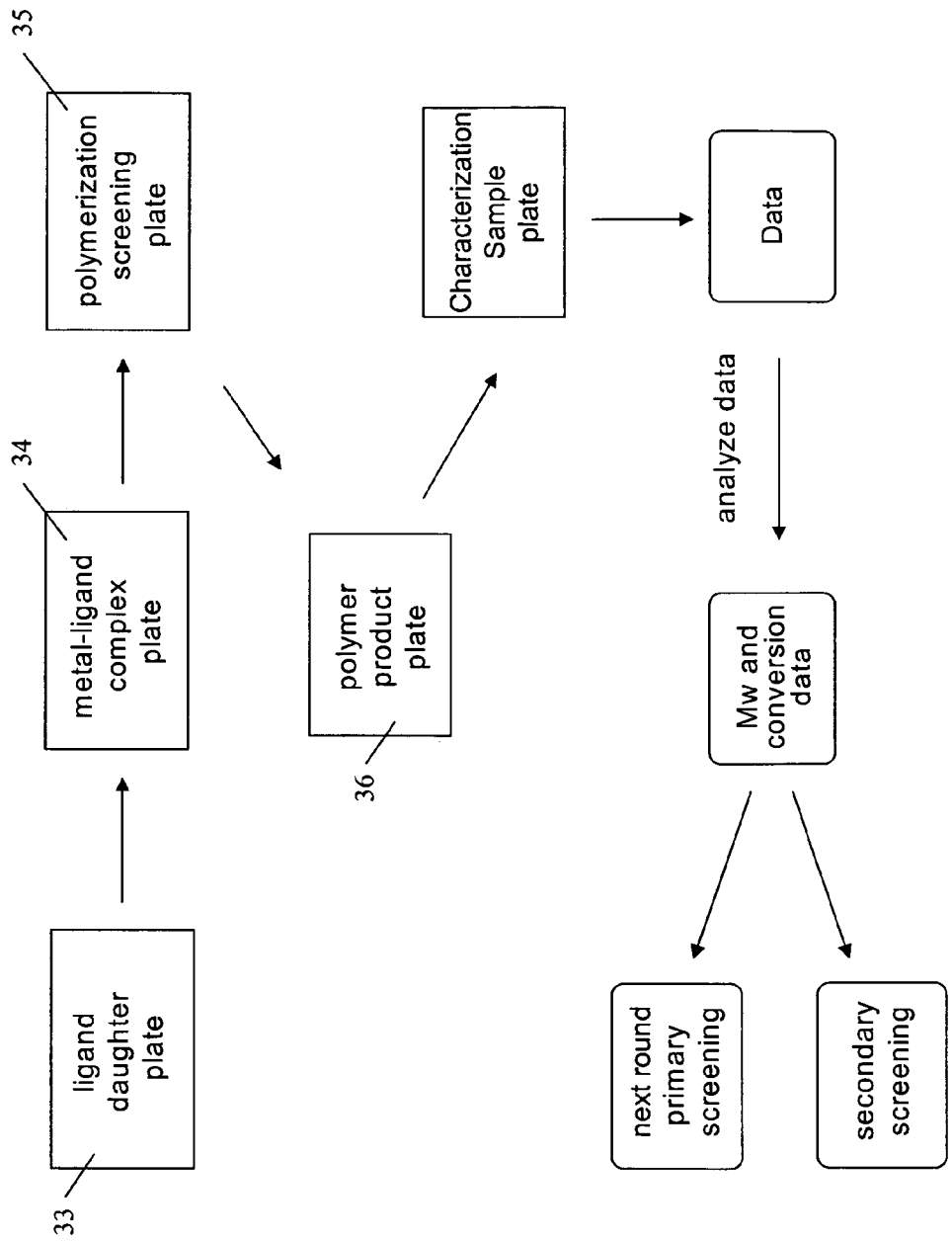
FIG. 3 is a flow chart illustrating a method of the present invention.
Figure 4:
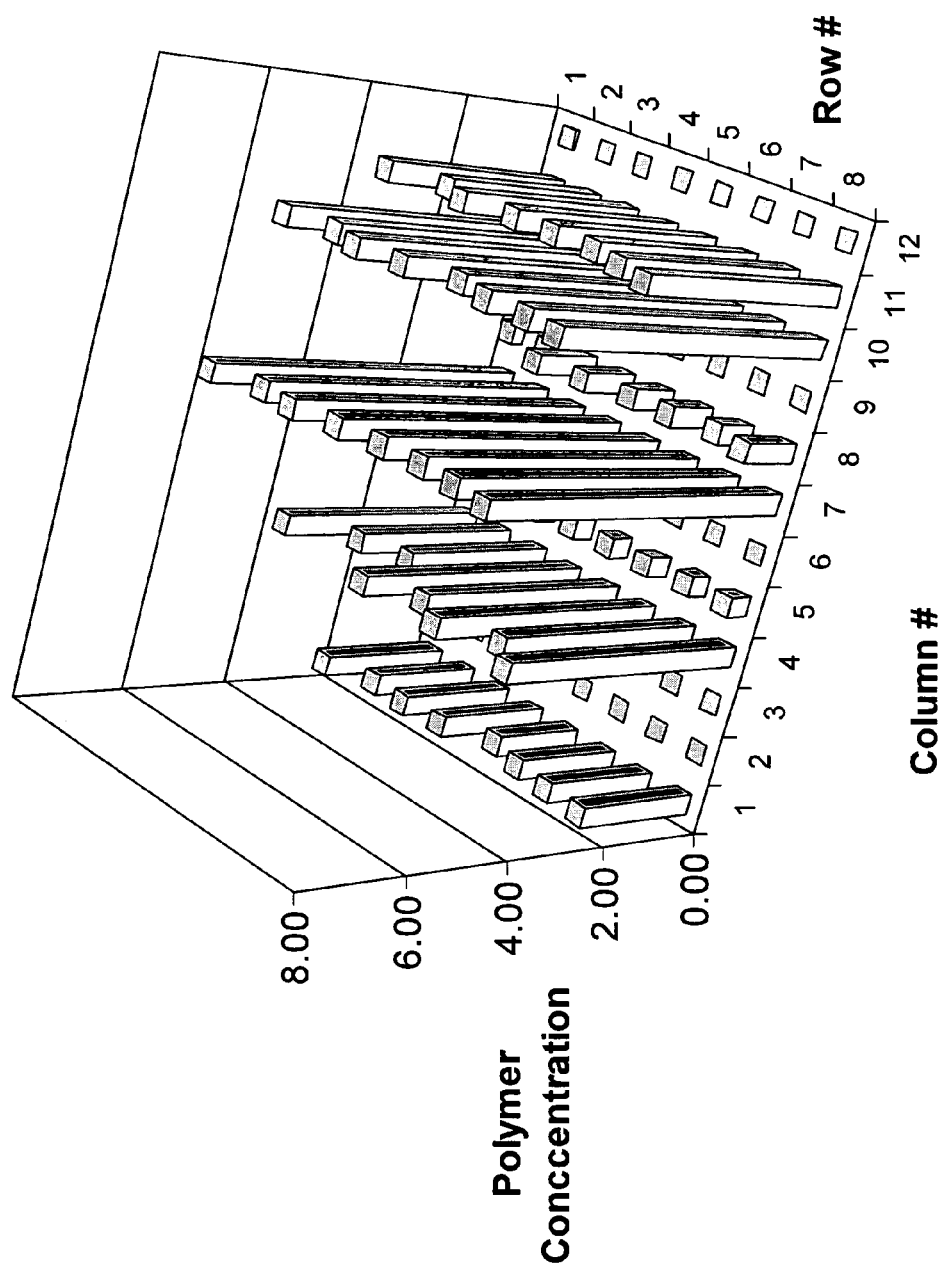
FIG. 4 is a three-dimensional plot of polymer concentrations for a plurality of reactions carried out according to the present invention, for the method validation examples.

FIGS. 2 and 3 give an overview of the process of producing, selecting and screening catalysts in accordance with the present invention. FIG. 2 illustrates that in one aspect the method of the invention can begin with a ligand library 26 and a set of metal precursors 27, as have been set forth earlier herein. As used herein, the term "library" refers to a defined collection of chemical compounds. Although FIG. 2 shares these libraries and precursors schematically in 6-by-6 arrays, it will be understood that FIG. 2 is illustrative rather than limiting of the present invention. The ligands and metal precursors are reacted in a systematic fashion to produce a series of metal-ligand libraries 30. Each of the metal-ligand libraries 30 can, if desired or necessary, be combined with additional activators or stabilizers that are illustrated in FIG. 4 as the array 31. The term "activator" is used herein in its usual sense in the polymer catalyst art. The combination of the metal-ligand libraries 30 with the activators or stabilizers 31 in turn leads to a larger set of catalyst libraries 32. These catalyst libraries are in turn used in the screening process of the present invention. See also, U.S. patent application Ser. No. 09/227,558, filed Jan. 8, 1999, which is incorporated herein by reference, which discusses work flow, polymerization conditions, etc. that may be used in this invention. Polymerization conditions generally refers to the process conditions under which a polymerization reaction is performed or at least attempted. Polymerization conditions include the amounts (volume, moles or mass) and ratios of starting components (e.g., ligands and metal precursors), time for reaction, reaction temperature, reaction pressure, rate and/or method of starting component addition to the reaction (or reactor), residence time (i.e., rate and/or method of product removal from the reaction or reactor), reaction stir rate and/or method, reaction quench rate and/or method, reaction atmosphere and other conditions that those of skill in the art will recognize. Polymerization temperature can range from about −40° C. to about 300° C., preferably between about 0° C. and about 200° C., more preferably between about 25° C. and about 150° C., and most preferably between about 40° C. and about 110° C. The atmosphere above the polymerization may be air, nitrogen, argon or another suitable atmosphere. Polymerization conditions also include the time for reaction, which may be from about 0.25 hours to about 72 hours, preferably in the range of from about 0.5 hours to about 12 hours, more preferably in the range of from about 0.5 hours to about 2 hours.

FIG. 3 illustrates the same or similar processes in a work flow fashion. As set forth therein, the procedure can optionally start with ligands in an appropriate ligand daughter plate 33. Metal precursors are added in the presence of a solvent in a complexation reaction to form a metal ligand complexes 34 in the plate. Appropriate monomers, alkyl compounds and catalyst activators are in turn added to produce a polymerization screening plate 35. After reaction and quenching take place, the result is a set of polymers in a product plate 36. It will be understood that because successive compositions are added to the original daughter plate 33, the reactants can remain in the same vials for several, or in some cases, all, of the desired steps. Thus, although FIG. 3 refers to differently labeled plates, the labels can represent the same physical plate before, during, and after particular reactions.

The polymers from the product plate 36 are then appropriately prepared for the preferred size exclusion (e.g., gel permeation) chromatography of the present invention, with typical preparation steps including an appropriate dilution, filtration, and intermediate sampling. The polymers are then in an appropriate condition for GPC in sample plate 37. The GPC is then carried out to produce a set of GPC data 40, which can be analyzed to produce the molecular weight and conversion data 41. Based on this information, selected catalysts can be taken to the next step of either primary or secondary screening 42 and 43, respectively.

The term "screening," including "primary screening" and "secondary screening," is used herein in its broadest sense to refer to a technique that identifies one or more desired properties of a library member. In combinatorial chemistry, screens are often used successively to identify progressively smaller or more focused groups of libraries that include more of the desired properties (quantitatively, qualitatively, or both) than do others of the screened group. For example, a primary screen may be used to test 5000–50,000 catalyst candidates for a particular property, and may identify 20–100 of the candidates as having the figure of merit as set by the primary screen. Those candidates can be tested in a secondary screen to identify candidates that appear to have superior properties or (in the case of catalysts) produce superior results. This small number of "lead candidates" are then developed and studied in the greatest detail. Therefore, in terms of throughput, the primary screen typically considered many more potential catalysts or compositions than the other experimentation. In this invention, the invention screen (using the array designations detailed above) may screen at least 24 potential catalysts or compositions and determining at least one property of the catalyst (or one property of a product made with the catalyst) in about 20 minutes or less per potential catalyst. Other throughput measures include screening at least 8 potential catalysts or compositions and determining at least one property of the catalyst (or one property of a product made with the catalyst) in about one hour or less per potential catalyst. Also screening at least 96 potential catalysts or compositions and determining at least one property of the catalyst (or one property of a product made with the catalyst) in about 10 minutes or less per potential catalyst, more preferably in about 8 minutes or less per potential catalyst and even more preferable in about 5 minutes or less per potential catalyst.

Polymerization reactions can be carried out for a desired period of time for an entire array, which will impact the throughput. Throughput times and rates typically exclude the time needed to prepare starting compounds or set up equipment.

It will be recognized, of course, that the number of starting candidates, primary-screened candidates, and lead candidates is arbitrary. In any case, however, the method of the invention improves the selection process for olefin polymerization catalysts. In the present embodiment, the method of the invention is particularly useful as, but is not limited to, a primary screen.

EXAMPLES

In the following examples, all procedures were performed in an inert atmosphere dry box, under an atmosphere of purified argon, and standard purification methods were used to dry and deoxygenate the solvents and reagents used, as would be known to one skilled in the art of olefin polymerization using organometallic catalysts. All glassware was oven dried and allowed to cool under vacuum before use. The 1-octene was deoxygenated by bubbling argon through the liquid, then dried by refluxing over calcium hydride (under argon atmosphere), then distilled from calcium hydride and stored over 3A molecular sieves under argon. Liquid handling robots and/or multi-channel pipettes were used for solvent and reagent solution dispensing.

Ambient temperature Size Exclusion Chromatography was performed on the poly(1-octene) products in the following examples using an automated "Rapid GPC" system as described in U.S. patent application Ser. Nos. 09/285,363; 09/285,333; 09/285,335; or 09/285,392; each of which was filed on Apr. 2, 1999 and each of which is incorporated herein by reference. In the Room Temperature Rapid GPC apparatus apparatus, a single 30 cm×7.5 mm linear column containing PLgel 10 um MixB (Polymer Laboratories) is used. The column was calibrated using narrow polystyrene standards. The concentration of the polymer in the toluene eluent was monitored using an evaporative light scattering detector. All of the molecular weight results obtained are relative to linear polystyrene standards.

Validation Examples

A validation study was carried out, consisting of testing a catalyst precursor known in the literature to be effective for copolymerization of α-olefins with ethylene, in a 1-octene homopolymerization primary screen. The purpose of the validation was to confirm the effectiveness and reproducibility of the proposed primary screening methodology and to confirm whether an appropriate catalyst (i.e., one already known to be effective) would have been found using the screen of the present invention.

Accordingly, (Cp*SiMe$_2$NtBu)TiMe$_2$(dimetylsilyl(tert-butylamido)(tetramethyl-cyclopentadienyl) titanium dimethyl,) was selected as the catalyst precursor for the validation study. This compound is available from Boulder Scientific Company (598 Third Street, P.O. Box 548, Mead, Colo. 80542) under the BSC-356 designation.

The array for this experiment was formed of 96 stirred 1 ml glass vials in an aluminum block (substrate), in a format of 8 rows by 12 columns. An array plate design consisting of 4 zones each of 3 columns, with different activator conditions in each zone, was selected, as illustrated below (with the integer prefixes representing the number of equivalents used relative to one equivalent of the titanium-based catalyst precursor):

| Columns: 1, 2, 3 | Columns: 4, 5, 6 | Columns: 7, 8, 9 | Columns: 10, 11, 12 |
|---|---|---|---|
| 2 B(C$_6$F$_5$)$_3$ | 2 B(C$_6$F$_5$)$_3$ + 5 TIBA | 2 [Ph$_3$C$^+$ B(C$_6$F$_5$)$_4^-$] | 2 [Ph$_3$C$^+$ B(C$_6$F$_5$)$_4^-$] + 5 TIBA |

The screening validation plate was prepared using (Cp*SiMe$_2$NtBu)TiMe$_2$ as the catalyst precursor at three different concentrations, selected as 400, 40, and 4 nanomoles (nmol), respectively of catalyst precursor, all in 220 µl of liquid sample. Each column contained 8 replicate examples. The first (left) column of each of the four activator zones contained 400 nmol of catalyst precursor in each well, the second (middle) column of each of the four activator zones contained 40 nmol of catalyst precursor in each well, and the third (right) column of each of the four activator zones contained 4 nmol of catalyst precursor in each well. Each vial also included 120 µl (85 mg) of 1-octene, and activator components (B(C$_6$F$_5$)$_3$ or [Ph$_3$C$^+$B(C$_6$F$_5$)$_4^-$]), and optionally an aluminum alkyl component (triisobutylaluminum—TIBA), and each reaction mixture had a final 220 µl total volume for the polymerization reaction.

The order of addition of reagents to the plate was as follows: first 120 µl of octene; then a variable volume of toluene to bring the total final volume up to 220 µl; then 20 µl TIBA (triisobutylaluminum) solution (100 mM, 10 mM, 1 mM in toluene) to appropriate cells; then 20 µl of catalyst precursor solution (20 (mM) (millimolar), 2 mM, or 0.2 mM in toluene) to all cells; then 40 µl B(C$_6$F$_5$)$_3$ or [Ph$_3$C$^+$B(C$_6$F$_5$)$_4^-$] solution (20 mM, 2 mM, or 0.2 mM in toluene) to appropriate cells. The time taken to add all the components to the vials was 14 minutes. The vials were then stirred at room temperature for one hour for polymerization to occur and then quenched with 30 µl of methanol.

After quenching the polymerization reaction, the reaction vessel was stirred at room temperature open to the air until the volatile components had evaporated.

The reaction products were then diluted by addition of toluene, and filtered to remove solid residues. The polymer product concentration and molecular weight (and MWD) were determined by rapid serial GPC analysis of the diluted, filtered, reaction products. The GPC analysis takes about 90 seconds for each sample, and thus can analyze the samples from a 96 vial array in just over two (2) hours.

A standard dilution protocol was followed such that the concentration of polymer (poly(1-octene)) product detected by GPC system correlated with the concentration of polymer in the vial at the end of the polymerization reaction, and thus could be used as a measure of the polymerization activity of the catalyst.

Figure 5:
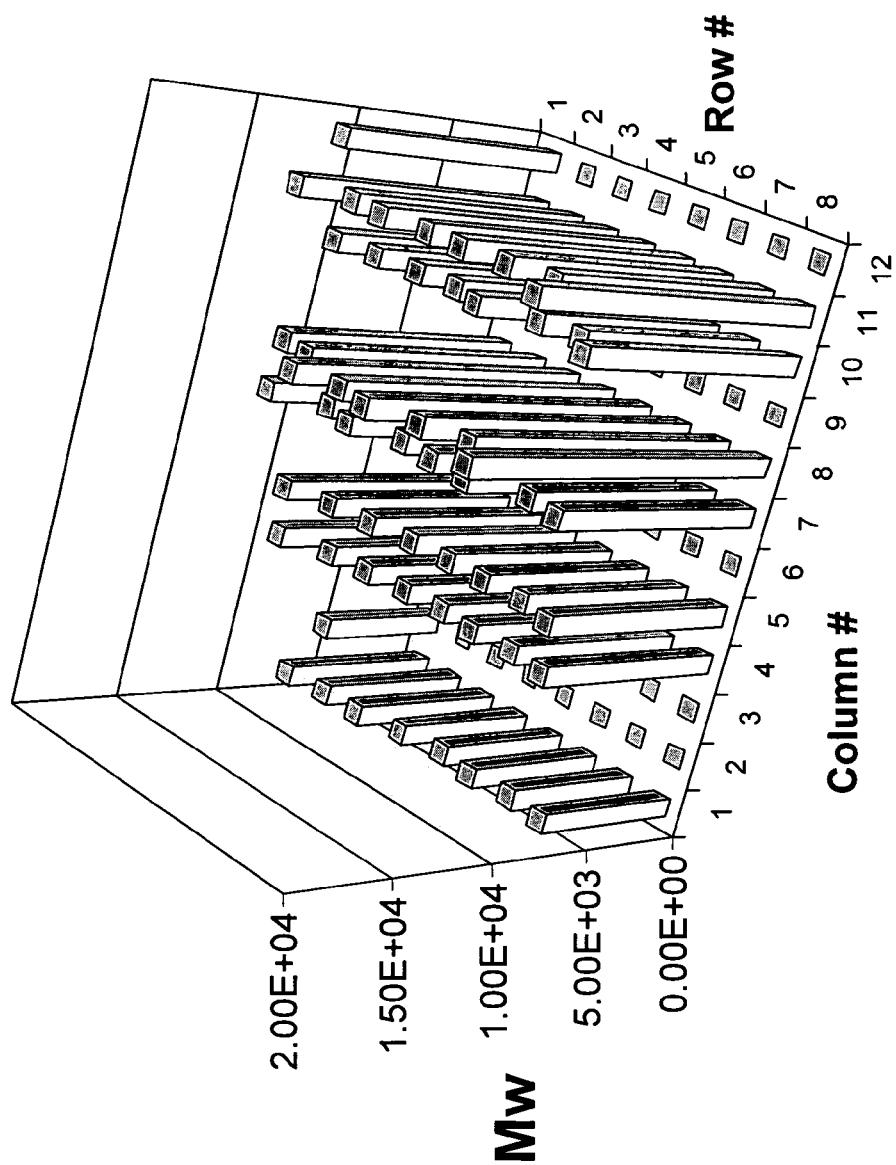
FIG. 5 is a three-dimensional plot of polymer molecular weight for a plurality of reactions carried out according to the present invention, for the method validation examples.

FIG. 4 is a three dimensional graph representing polymer concentration as plotted against the vials which in turn represent the various combinations just set forth. Because of the dilutions employed in these examples, the polymer concentrations observed in columns 7 and 10 represent approximately full conversion of the 1-octene monomer to poly(1-octene). FIG. 5 plots the same information with respect to the combinations in the array, but as against poly(1-octene) molecular weight.

Table 1 shows relative polymer concentrations from the validation examples. The concentrations set forth in Table 1 are those measured by the GPC technique. They were obtained by: quenching the reactions, allowing the volatiles to evaporate, diluting the 20 µl from the quenched reactions to 800 µl, filtering, and then diluting 50 µl portions to 800 µl. These concentrations optimize the performance and results of the GPC.

TABLE 1

Relative polymer concentrations from method validation examples, shown by row/column number.

| Polymer Conc. By Row/Column | 1 | 2 | 3 | 4 | 5 | 6 | 7 | 8 | 9 | 10 | 11 | 12 |
|---|---|---|---|---|---|---|---|---|---|---|---|---|
| 1 | 2.47 | 0.03 | | 4.05 | 0.65 | | 6.20 | 0.26 | | 5.50 | 3.73 | 0.05 |
| 2 | 2.11 | | | 3.21 | 0.57 | | 5.85 | 0.23 | | 5.19 | 3.23 | |
| 3 | 2.24 | | | 2.92 | 0.43 | | 6.02 | 1.30 | | 5.56 | 3.72 | |
| 4 | 2.17 | | | 4.58 | 0.40 | | 5.83 | 1.05 | | 5.37 | 3.42 | |
| 5 | 1.74 | | | 4.08 | 0.40 | | 5.70 | 0.83 | | 4.98 | 3.43 | |
| 6 | 2.04 | | | 4.62 | 0.42 | | 5.67 | 0.86 | | 5.27 | 3.38 | |
| 7 | 2.21 | | | 4.03 | 0.39 | | 5.80 | 0.72 | | 5.26 | 3.73 | |
| 8 | 2.35 | | | 4.74 | 0.44 | | 6.00 | 1.05 | | 5.49 | 4.07 | |

TABLE 2

Mw of polymer products from method validation example, shown by row/column number.

| Mw by Row/Column | 1 | 2 | 3 | 4 | 5 | 6 | 7 | 8 | 9 | 10 | 11 | 12 |
|---|---|---|---|---|---|---|---|---|---|---|---|---|
| 1 | 7.5E+3 | 6.2E+3 | | 9.8E+3 | 10.1E+3 | | 12.2E+3 | 12.0E+3 | | 10.7E+3 | 13.2E+3 | 11.5E+3 |
| 2 | 7.3E+3 | | | 8.9E+3 | 9.5E+3 | | 10.8E+3 | 12.6E+3 | | 10.4E+3 | 12.2E+3 | |
| 3 | 7.4E+3 | | | 8.8E+3 | 9.3E+3 | | 11.7E+3 | 15.1E+3 | | 10.1E+3 | 12.7E+3 | |
| 4 | 6.8E+3 | | | 8.6E+3 | 8.9E+3 | | 10.7E+3 | 14.5E+3 | | 10.0E+3 | 12.2E+3 | |
| 5 | 6.5E+3 | | | 8.6E+3 | 8.8E+3 | | 11.2E+3 | 15.2E+3 | | 11.0E+3 | 12.4E+3 | |
| 6 | 6.9E+3 | | | 8.9E+3 | 9.0E+3 | | 11.4E+3 | 14.4E+3 | | 9.7E+3 | 12.1E+3 | |
| 7 | 6.7E+3 | | | 8.8E+3 | 9.0E+3 | | 10.0E+3 | 13.8E+3 | | 9.5E+3 | 11.6E+3 | |
| 8 | 7.1E+3 | | | 9.2E+3 | 9.7E+3 | | 10.7E+3 | 15.9E+3 | | 11.5E+3 | 14.7E+3 | |

Based on this study, a catalyst level of about 400 nmole in about 220 µL total volume was selected as being very suitable for using such a 1-octene homopolymerization methodology as a primary screen for identifying useful catalysts from an array of potential catalysts, examples of which are described below.

Examples 1–16

Examples Illustrating Method of the Invention for Screening Arrays of Potential Catalysts to Identify Useful Polymerization Catalysts The following Examples 1–16 illustrate a method of the invention for screening arrays of potential catalysts to identify useful polymerization catalysts. Specifically, the following are examples of using 1-octene homopolymerization as a primary screen for identifying useful catalysts from an array of potential catalysts.

The following 1-octene homopolymerization experiments were carried out in 1 mL glass vials fitted in an aluminum block, and in some cases sealed with a Teflon-faced silicon rubber gasket backed with a stainless steel lid. An array, consisting of an aluminum block containing an 8×12 array of 1 mL glass vials each containing a stir bar, and, optionally, 0.36 µmol of the respective ligand, was placed above a magnetic stirrer to provide stirring.

Example 1

22 µL of toluene was added to a vial in the array containing 0.36 µmol of the ligand tetrahydrofurfuryl alcohol, (shown in Column 1 Row 1 of FIG. 4, labeled "Example 1"). 19 µL of a 21 mM solution (0.40 µmol) of $Hf(CH_2C_6H_5)_4$ in toluene ("metal precursor solution") was then added to the vial, and the metal-ligand reaction mixture was stirred for approximately 35 minutes at room temperature.

After stirring at room temperature for approximately 35 minutes, 120 µL (85 mg) of 1-octene was added. After stirring at room temperature for approximately 5 more minutes, 19 µL of a 0.10 M solution (1.9 µmol, about 5 equivalents per Hf) of TEAL (triethylaluminum, $AlEt_3$)) in toluene ("alkyl solution") was added. After stirring at room temperature for approximately 3 more minutes, 39 µL of a 10.3 mM solution (0.40 µmol, 1 equivalent per Hf) of AniliniumBF20, (N,N-dimethylanilinium-tetrakis(pentafluorophenyl)borate) in toluene ("activator solution") was added, bringing the total reaction volume to about 220 µL. The reaction mixture was then stirred at room temperature for 1 hour under an argon atmosphere in a dry box. The reaction vessel was then removed from the inert atmosphere dry box, and the polymerization reaction was then immediately quenched by addition of 30 µL of methanol. After quenching the polymerization reaction, the reaction vessel was stirred at room temperature open to the air until the volatile components had evaporated.

The reaction products were then diluted by addition of toluene, and filtered to remove solid catalyst residues. The polymer product concentration and molecular weight (and MWD) were determined by rapid serial GPC analysis of the diluted, filtered, reaction products.

A standard dilution protocol was followed such that the concentration of polymer (poly(1-octene)) product detected by GPC system correlated with the concentration of polymer in the vial at the end of the polymerization reaction, and thus could be used as a measure of the polymerization activity of the catalyst.

Figure 6:
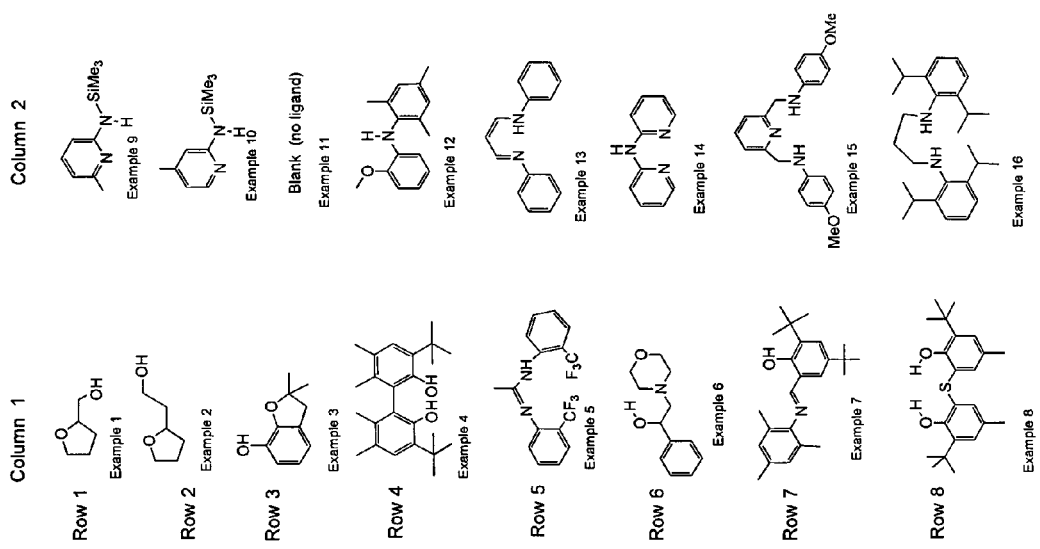
FIG. 6 shows the ligands employed in Examples 1–16.

Examples 2–16 were performed as described for Example 1, except different ligands were used. FIG. 6 describes the ligands used in the given examples. For Example 11, no ligand was used, and the metal precursor was added to a vial containing only toluene and a magnetic stir bar.

Results of Examples 1–16

Figure 7:
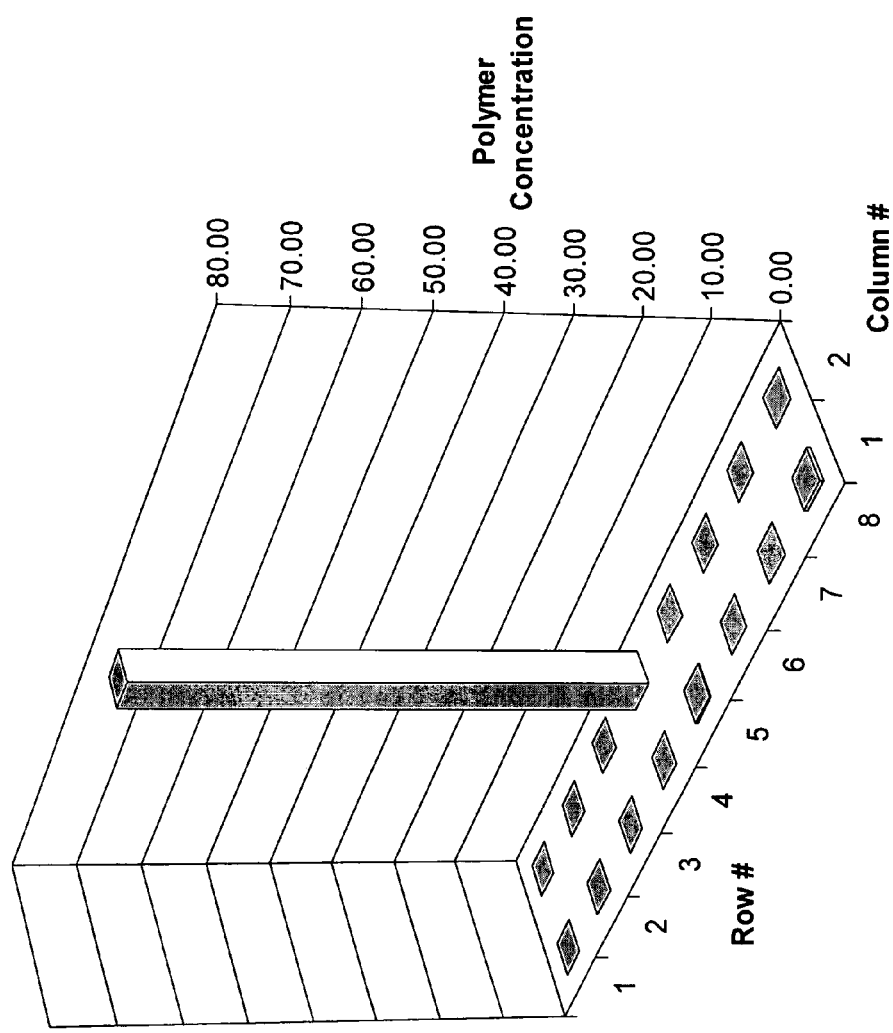
FIG. 7 is a three-dimensional plot of polymer concentrations for a plurality of reactions carried out according to the present invention, for Examples 1–16.
Figure 8:
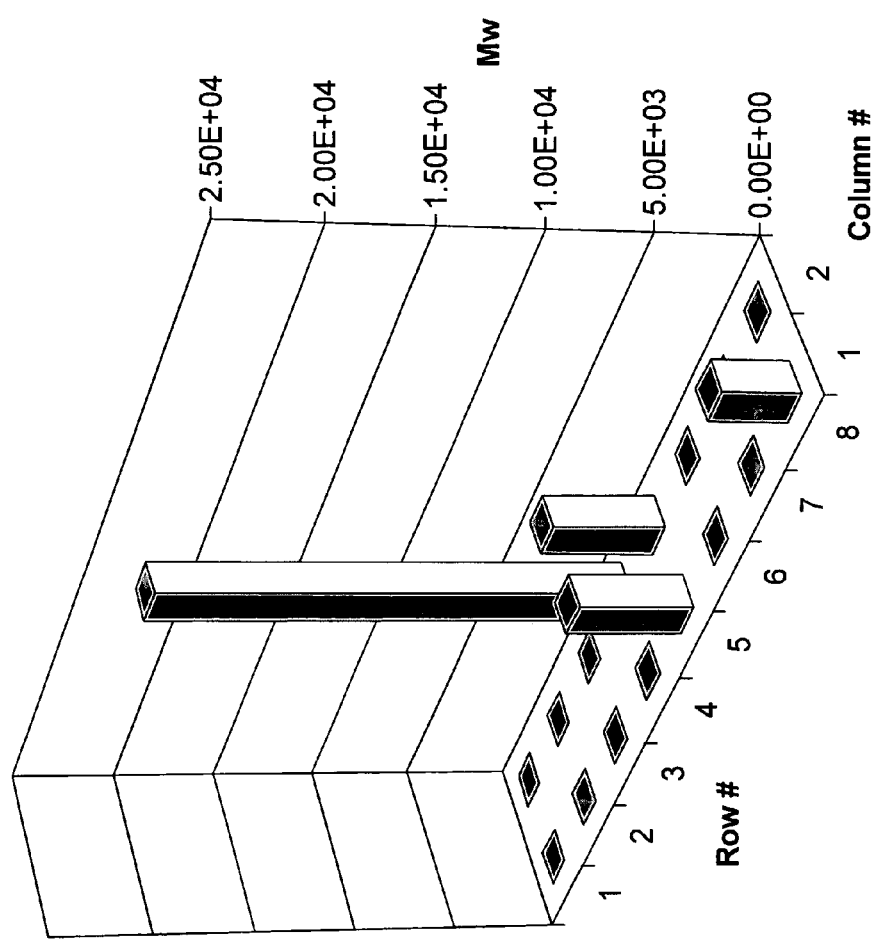
FIG. 8 is a three-dimensional plot of polymer Mw for a plurality of reactions carried out according to the present invention, for Examples 1–16.

FIGS. 7 and 8 show polymer concentration and molecular weight of the Examples 1–16. Examples 1–8 are shown in column 1, Examples 2–16 are shown in column 2.

TABLE 3

Ligand #, Alkyl reagent, Activator, Polymer Concentration, and Mw for Examples 1–16.

| Example # | Ligand # | Alkyl reagent | Activator | Polymer conc. | Mw |
|---|---|---|---|---|---|
| 1 | 1 | TEAL | ABF20 | 0.0 | |
| 2 | 2 | TEAL | ABF20 | 0.0 | |
| 3 | 3 | TEAL | ABF20 | 0.0 | |
| 4 | 4 | TEAL | ABF20 | 0.0 | |
| 5 | 5 | TEAL | ABF20 | 0.3 | 5.5E+03 |
| 6 | 6 | TEAL | ABF20 | 0.0 | |
| 7 | 7 | TEAL | ABF20 | 0.0 | |
| 8 | 8 | TEAL | ABF20 | 0.5 | 3.7E+03 |
| 9 | 9 | TEAL | ABF20 | 0.0 | |
| 10 | 10 | TEAL | ABF20 | 0.0 | |
| 11 | blank | TEAL | ABF20 | 0.0 | |
| 12 | 12 | TEAL | ABF20 | 78.2 | 2.3E+04 |
| 13 | 13 | TEAL | ABF20 | 0.1 | 5.5E+03 |
| 14 | 14 | TEAL | ABF20 | 0.0 | |
| 15 | 15 | TEAL | ABF20 | 0.0 | |
| 16 | 16 | TEAL | ABF20 | 0.0 | |

Key:
ABF20 = N,N-dimethylanilinium-tetrakis(pentafluorophenyl)borate
TBF20 = Triphenylcarbenium-tetrakis(pentafluorophenyl)borate
TEAL = AlEt$_3$ = triethylaluminum
TIBA = Al(iBu)$_3$ = triisobutylaluminum
Mw are shown using scientific notation, whereby 5.5E+03 = 5.5 × 10$^3$ = 5500, 2.3E+04 = 2.3 × 10$^4$ = 23000, and so on.

Example 17

Use of Catalyst Composition that Showed High Performance in 1-Octene Polymerization Primary Screen as a Catalyst for Ethylene/1-Octene Copolymerization The polymerization reaction of this Example was carried out in an inert atmosphere glove box containing a parallel pressure reactor, which is fully described in pending U.S. patent application Ser. No. 09/177,170, filed Oct. 22, 1998, Ser. No. 09/211,982, filed Dec. 14, 1998, Ser. No. 09/239,223, filed Jan. 29, 1999, and WO 00/09255, each of which is incorporated herein by reference. The total volume of each polymerization reaction was 6.7 mL. Toluene was used as the polymerization solvent.

High temperature Size Exclusion Chromatography was performed using an automated "Rapid GPC" system as described in U.S. patent application Ser. Nos. 09/285,363; 09/285,333; 09/285,335; or 09/285,392; each of which was filed on Apr. 2, 1999 and each of which is incorporated herein by reference. In the current apparatus, a series of two 30 cm×7.5 mm linear columns, with one column containing PLgel 10 um, MixB and the other column containing PLgel 5 um, MixC. The columns were calibrated using narrow polystyrene standards. A flow rate of 1.5 mL/min. was used, with an injection volume of 40 μL of a polymer solution with a concentration of about 1 mg/mL, an oven temperature of 160° C., and the polymer samples dissolved in o-dichlorobenzene. The concentration of the polymer in the eluent was monitored using an evaporative light scattering detector. All of the molecular weight results obtained are relative to linear polystyrene standards.

FTIR was performed on a Bruker Equinox 55+IR Scope II in reflection mode with 16 scans, to determine the ratio of octene to ethylene incorporated in the polymer product, represented as the weight % (wt. %) of octene incorporated in the polymer (wt. % octene). Wt. % octene was obtained from ratio of peak heights at 1378 cm$^{-1}$ and 4335 cm$^{-1}$. This method was calibrated using a set of ethylene/1-octene copolymers with a range of known wt. % octene content.

Preparation of the polymerization reactor prior to injection of catalyst composition: A pre-weighed glass vial insert and disposable stirring paddle were fitted to each reaction vessel of the reactor. The reactor was then closed, and 4.85 mL of toluene followed by 0.15 mL of 1-octene was injected into each reaction vessel through a valve. The temperature was then set to the appropriate setting, and the toluene/1-octene mixture was exposed to ethylene gas at 100 psi pressure. An ethylene pressure of 100 psi in the pressure cell and the temperature setting were maintained, using computer control, until the end of the polymerization experiment.

Preparation of Stock Solutions: The "alkyl reagent solution" is a 0.05 M solution of TEAL (triethylaluminum, AlEt$_3$ (68 μL in 10 mL)). The "activator solution" is a 5 mM solution of N,N'-dimethylanilinium tetrakis(pentafluorophenyl)borate in toluene (20 mg in 5 mL toluene).

In situ preparation of metal ligand compositions: Stock solutions were prepared as follows: The "metal precursor solution" is a 20 mM solution of Hf(CH$_2$C$_6$H$_5$)$_4$ in toluene (54 mg in 5 mL toluene). The "ligand solution" is a 20 mM solution of Ligand # 12 (the amine-ether ligand 2,4,6-Me$_3$C$_6$H$_2$—NH—C$_6$H$_4$-2-OMe), in toluene. 2.0 mL of the ligand solution was added to an 8 mL glass vial at room temperature. To this same vial was added, 2.0 mL of the metal precursor solution, to form the metal-ligand combination solution. The resultant solution was allowed to react for 1 hour prior to injection of a sample of this "metal-ligand solution" reaction product mixture into the reactor as described below.

Injection of solutions into the reactor vessel: After the toluene/1-octene mixture was saturated with ethylene at 100 psi pressure, 0.200 mL of the alkyl reagent solution followed immediately by 0.300 mL of toluene, were injected into the reaction vessel. About 30 seconds later, 0.400 mL of the "activator solution" followed immediately by 0.300 mL of toluene, were injected into the reaction vessel. About another 30 seconds later, 0.200 mL of the "metal ligand solution" followed immediately by 0.300 mL of toluene, were injected into the reaction vessel. The reaction was allowed to proceed for one hour.

Product work up: The glass vial insert, containing the polymer product and solvent, was then removed from the pressure cell and removed from the inert atmosphere dry box, and the volatile components were allowed to evaporate at room temperature. After most of the volatile components had evaporated, the vial contents were dried thoroughly by evaporation at elevated temperature under reduced pressure. The vial was then weighed to determine the yield of polymer product. The polymer product was then analyzed by rapid GPC, as described above to determine the molecular weight of the polymer produced, and by FTIR spectroscopy to determine the ratio of octene to ethylene incorporated in the polymer product, represented as the weight % of octene incorporated in the polymer. Results are presented in Table 4.

TABLE 4

Use of catalyst composition that showed high performance in 1-octene polymerization primary screen as a catalyst for ethylene/1-octene copolymerization:

| Example # | µmol Hf | Temp. (° C.) | Copolymer yield (g) | Mw | wt. % octene |
|---|---|---|---|---|---|
| 17 | 2.0 | 90 | 0.185 | $8.4 \times 10^4$ | 28 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A method of screening potential catalysts for polymerization performance wherein the polymerization performance of the potential catalysts is determined for at least a first monomer as a predictor for the polymerization performance of the potential catalysts for at least a second monomer, the first and second monomers being different from each other and the first monomer being an olefin other than ethylene, the method comprising:
    concurrently reacting an array of at least 8 potential polymerization catalysts that are different from each other with only the first monomer and not the second monomer under polymerization conditions in a first reaction;
    determining the polymerization performance of each of the at least 8 potential catalysts reacted with the first monomer in the first reaction;
    identifying one or more catalysts from the at least 8 potential polymerization catalysts based on the polymerization performance of the catalysts in the first reaction; and
    reacting the one or more identified catalysts with the first and second monomers under polymerization conditions in a second reaction.

2. A screening method according to claim 1 wherein the step of determining the polymerization performance comprises measuring a characteristic of the reaction products.

3. A screening method according to claim 1 further comprising the step of polymerizing the at least second monomer using the catalyst.

4. A screening method according to claim 3 comprising polymerizing the second monomer in commercial quantities.

5. A screening method according to claim 1 wherein the step of determining the polymerization performance comprises analyzing the polymer using a high throughput chromatography technique.

6. A screening method according to claim 5 comprising analyzing the polymer using size exclusion chromatography.

7. A screening method according to claim 1 wherein the array of potential catalysts comprises a substrate having wells with each of the at least 8 potential catalysts residing in a different well of the substrate.

8. A screening method according to claim 7, wherein the reacting steps further comprise adding other compositions to the wells other than the first or second monomers or the catalysts.

9. A screening method according to claim 7 comprising dispensing the first monomer as a liquid into each reaction vessel that contains one of the potential catalysts prior to the step of reacting the catalyst with the first monomer.

10. A screening method according to claim 7 comprising distributing the first monomer as a gas to each reaction vessel that contains one of the potential catalysts prior to the step of reacting the catalyst with the first monomer.

11. A screening method according to claim 7 further comprising:
    activating the potential catalysts; and
    wherein at least a portion of the at least first monomer is provided to each reaction vessel prior to activation of the potential catalysts.

12. A screening method according to claim 1, wherein the step of determining the polymerization performance of the catalysts comprises measuring a property of any polymer sample made during the reaction step, wherein the property is selected from the group consisting of molecular weight, polydispersity index, viscosity, concentration, solvent extractables, solubility, melt flow index, glass transition temperature, melting point, percent crystallinity, density, polymer mass, polymer composition, polymer structure, polymer architecture, and combinations thereof.

13. A screening method according to claim 1, wherein the determination of polymerization performance comprises measuring a property of the reaction mixture from any members of the array, wherein the property is selected from the group consisting of monomer concentration, monomer conversion, ratio of catalyst to monomer, light scattering, viscosity, temperature, visual inspection, intrinsic viscosity, polymer concentration, molecular weight, and combinations thereof.

14. A screening method according to claim 1, wherein the reacting step is carried out to a predetermined point selected from the group consisting of time, monomer consumption, heat of reaction, polymer concentration, viscosity, and molecular weight.

15. A screening method according to claim 14 and further comprising quenching the reaction at the predetermined point.

16. A screening method according to claim 1, wherein the reacting step comprises concurrently reacting each of the at least 8 potential catalysts in the array with the first monomer.

17. A screening method according to claim 1, wherein the determination is used as a predictor for the polymerization activity of the potential catalysts for a co-polymerization of the second monomer with a third monomer.

18. A screening method according to claim 17 and further comprising the step of copolymerizing the second and third monomers.

19. A screening method according to claim 18 comprising copolymerizing the second and third monomers in commercial quantities.

20. A method according to claim 1 wherein the first monomer is an α-olefin.

21. A method according to claim 20 wherein the first monomer is selected from the group consisting of 1-octene, 1-hexene, 1-heptene, 1-nonene, and 1 decene.

22. A screening method according to claim 1 wherein at least the first monomer is represented by the formula:

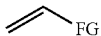

wherein FG is a halogen or a functional group that contains at least one heteroatom.

23. A screening method for high throughput screening of potential catalysts for polymerization performance for at least a second monomer, comprising:
concurrently reacting a plurality of potential catalysts arrayed on a substrate with a first monomer and not the second monomer in a first reaction, the first and second monomers being different from each other and the first monomer being an olefin other than ethylene;
determining a property of any polymer sample or polymerization mixture made during the first reaction at a rate of one hour or less per potential catalyst,
identifying one or more catalysts from the potential polymerization catalysts based on the properties of the samples from the first reaction; and
reacting the one or more identified catalysts with the first and second monomers under polymerization conditions in a second reaction.

24. A screening method according to claim 23 comprising:
concurrently reacting at least 24 potential catalysts; and
determining properties at a rate of about 20 minutes or less per potential catalyst.

25. A screening method according to claim 23 wherein the step of determining the polymerization performance comprises measuring a characteristic of the reaction products.

26. A screening method according to claim 23 wherein the step of determining a property comprises measuring the concentration of the polymer formed using the catalyst.

27. A screening method according to claim 23 wherein the step of determining a property comprises measuring the polydispersity index of the polymer formed using the catalyst.

28. A screening method according to claim 23 wherein the step of determining a property comprises analyzing the polymer using a high throughput chromatography technique.

29. A screening method according to claim 28 comprising analyzing the polymer using size exclusion chromatography.

30. A screening method according to claim 23, wherein the step of determining a property comprises measuring a property of any polymer sample made during the reaction step, wherein the property is selected from the group consisting of molecular weight, polydispersity index, viscosity, concentration, solvent extractables, solubility, melt flow index, glass transition temperature, melting point, percent crystallinity, density, polymer mass, polymer composition, polymer structure, polymer architecture, and combinations thereof.

31. A screening method according to claim 23, wherein the step of determining a property comprises measuring a property of the polymerization reaction mixture from any members of the array, wherein the property is selected from the group consisting of monomer concentration, monomer conversion, ratio of catalyst to monomer, light scattering, viscosity, temperature, visual inspection, intrinsic viscosity, polymer concentration, molecular weight, and combinations thereof.

32. A screening method according to claim 23, wherein the concurrent reactions are carried out to a predetermined point selected from the group consisting of time, monomer consumption, heat of reaction, polymer concentration, viscosity, and molecular weight.

33. A screening method according to claim 32 and further comprising concurrently quenching the reaction at the predetermined point.

34. A screening method according to claim 23, wherein the determination is used as a predictor for the polymerization activity of the potential catalysts for a co-polymerization of the second monomer with at least a third monomer.

35. A screening method according to claim 34 and further comprising the step of copolymerizing the at least second and third monomers.

36. A screening method according to claim 35 comprising copolymerizing the at least second and third monomers in commercial quantities.

37. A method according to claim 23 wherein the first monomer is an olefin other than ethylene.

38. A method according to claim 23 wherein the first monomer is 1-octene, 1-hexene, 1-heptene, 1-nonene, and 1 decene.

39. A screening method according to claim 23, wherein the first monomer is represented by a formula selected from the group consisting of:

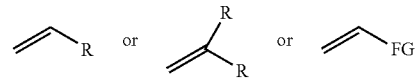

wherein each R is independently selected from the group consisting of halogen, alkyl, substituted alkyl, aryl, substituted aryl, heteroalkyl, cycloalkyl, substituted cycloalkyl, heterocycloalkyl, substituted heterocycloalkyl, heteroaryl, substituted heteroaryl, alkoxy, sityl, boryl, phosphino, amino, thio, seleno and combinations thereof; and FG is halogen or a functional group that contains at least one heteroatom.

40. A method of screening potential catalysts for polymerization performance wherein the polymerization performance of the potential catalysts is determined for at least a first monomer as a predictor for the polymerization performance of the potential catalysts for at least a second monomer, the first and second monomers being different from each other and the first monomer being an olefin other than ethylene, the method comprising:
concurrently reacting an array of at least 8 potential polymerization catalysts that are different from each other with at least the first monomer and not the second monomer under polymerization conditions in a first reaction;
determining the polymerization performance of each of the potential catalysts with the at least first monomer in the first reaction by analyzing products of the first reaction; and
polymerizing the first and second monomers as copolymers or higher-order polymers in a second reaction using one of the catalysts in the array based upon the polymerization performance of the catalyst.

41. A screening method according to claim 1, wherein the polymerization performance of the identified catalysts for the first reaction has a figure of merit for a particular property.

42. A screening method according to claim 1, further comprising determining the polymerization performance of each of the one or more catalysts reacted with the first and second monomers in the second reaction.

43. A screening method according to claim 23, wherein the polymer samples produced by the identified catalysts for the first reaction have a figure of merit for a particular property.

44. A screening method according to claim 23, further comprising determining a property of any polymer sample or polymerization mixture made during the second reaction at a rate of one hour or less per potential catalyst.

* * * * *